(12) United States Patent
Oshima et al.

(10) Patent No.: US 6,870,015 B2
(45) Date of Patent: Mar. 22, 2005

(54) CATALYST COMPONENT FOR ADDITION POLYMERIZATION, PROCESS FOR PRODUCING CATALYST FOR ADDITION POLYMERIZATION AND PROCESS FOR PRODUCING ADDITION POLYMER

(75) Inventors: Hideki Oshima, Ichihara (JP); Kazuo Takaoki, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 21 days.

(21) Appl. No.: 10/253,587

(22) Filed: Sep. 25, 2002

(65) Prior Publication Data

US 2003/0060579 A1 Mar. 27, 2003

(30) Foreign Application Priority Data

Sep. 27, 2001 (JP) ........................................ 2001-296464
Sep. 27, 2001 (JP) ........................................ 2001-296465

(51) Int. Cl.$^7$ .............................. C08F 4/44; C08F 4/64; C08F 4/642
(52) U.S. Cl. ................. 526/114; 526/113; 526/160; 526/943; 502/113; 502/129; 502/153; 502/117
(58) Field of Search ................... 502/113, 129, 502/153; 526/113, 114, 129, 153

(56) References Cited

U.S. PATENT DOCUMENTS

| 4,530,914 A | 7/1985 | Ewen et al. |
| 4,935,474 A | 6/1990 | Ewen et al. |
| 5,252,529 A | 10/1993 | Ueda et al. |
| 5,296,565 A | 3/1994 | Ueda et al. |
| 5,439,994 A | 8/1995 | Inoue et al. |
| 5,534,473 A | 7/1996 | Welch et al. |
| 5,719,241 A | * 2/1998 | Razavi et al. ............... 526/119 |
| 6,069,213 A | 5/2000 | Nemzek et al. |
| 6,136,936 A | 10/2000 | Dall'Occo et al. |
| 6,143,682 A | 11/2000 | Fisher |

FOREIGN PATENT DOCUMENTS

| EP | 0 128 045 A1 | 12/1984 |
| JP | 60-35008 A | 2/1985 |
| JP | 5-255437 A | 10/1993 |

* cited by examiner

*Primary Examiner*—Roberto Rabago
(74) *Attorney, Agent, or Firm*—Birch, Stewart, Kolasch & Birch, LLP

(57) ABSTRACT

There are provided:

(I) a catalyst component for addition polymerization comprising:

(i) a transition metal compound having (a) two cyclopentadiene type anion skeleton-carrying groups, which are linked with each other directly or through a bridging group, and (b) a hafnium atom as its central metal, and (ii) a transition metal compound having (a) two substituted cyclopentadiene type anion skeleton-carrying groups, which are not linked with each other, and (b) a zirconium atom or a titanium atom as its central atom; and (II) a process for producing a catalyst for addition polymerization, which comprises the step of contacting the above catalyst component with a co-catalyst component for activation.

10 Claims, No Drawings

CATALYST COMPONENT FOR ADDITION POLYMERIZATION, PROCESS FOR PRODUCING CATALYST FOR ADDITION POLYMERIZATION AND PROCESS FOR PRODUCING ADDITION POLYMER

FIELD OF THE INVENTION

The present invention relates to a catalyst component for addition polymerization comprising a metallocene transition metal compound; a process for producing a catalyst for addition polymerization; and a process for producing an addition polymer.

BACKGROUND OF THE INVENTION

In recent years, there has been proposed a process for producing an addition polymer, which process comprises the step of polymerizing a monomer for addition polymerization such as an olefin using a catalyst, which catalyst is a combination of a transition metal compound such as a metallocene complex and a non-metallocene compound with a compound such as an aluminoxane. Such a catalyst is called a single site catalyst.

Examples thereof are a catalyst, which is a combination of bis (cyclopentadienyl) zirconium dichloride with methylaluminoxane (JP-A 58-19309); and a catalyst, which is a combination of bis(cyclopentadienyl)zirconium dimethyl with a boron compound such as tri(n-butyl)ammonium tetrakis(pentafluorophenyl)borate (JP-W 1-502036).

However, an addition polymer obtained by polymerization using these catalysts has problems that (1) its melt tension is not so satisfactorily high that a tubular film can not be molded speedily and steadily, and (2) its melt flow rate is not so satisfactorily high that it does not have good flowability.

SUMMARY OF THE INVENTION

An object of the present invention is to provide a process for producing an addition polymer having high melt tension and superior processability; a process for producing a catalyst for addition polymerization used for producing such an addition polymer; and a catalyst component for addition polymerization used for producing such a catalyst for addition polymerization.

Another object of the present invention is to provide a process for producing an addition polymer having high melt tension, high melt flow rate ratio and superior processability; a process for producing a catalyst for addition polymerization used for producing such an addition polymer; and a catalyst component for addition polymerization used for producing such a catalyst for addition polymerization.

The present invention provides a catalyst component (hereinafter referred to as "catalyst component (A1)") for addition polymerization comprising:

(i) a transition metal compound having (a) two cyclopentadiene type anion skeleton-carrying groups, which are linked with each other directly or through a bridging group, and (b) a hafnium atom as its central metal, and (ii) a transition metal compound having (a) two substituted cyclopentadiene type anion skeleton-carrying groups, which are not linked with each other, and (b) a zirconium atom or a titanium atom as its central atom.

The present invention also provides a catalyst component (hereinafter referred to as "catalyst component (A2)") for addition polymerization comprising:

(i) a transition metal compound having (a) two cyclopentadiene type anion skeleton-carrying groups, which are linked with each other directly or through a bridging group, and (b) a hafnium atom as its central metal, (ii) a transition metal compound having (a) two substituted cyclopentadiene type anion skeleton-carrying groups, which are not linked with each other, and (b) a zirconium atom or a titanium atom as its central atom, and (iii) a transition metal compound having (a) two cyclopentadiene type anion skeleton-carrying groups, which are linked with each other directly or through a bridging group, and (b) a zirconium atom or a titanium atom as its central metal.

The present invention further provides a process for producing a catalyst for addition polymerization, which comprises the step of contacting the above-mentioned catalyst component (A1) or (A2) with a co-catalyst component for activation with each other.

The present invention still further provides a process for producing an addition polymer, which comprises the step of polymerizing a monomer in the presence of the catalyst for addition polymerization obtained according to the above-mentioned process for producing a catalyst for addition polymerization.

Hereinafter, the above-mentioned catalyst component (A1) and catalyst component (A2) are referred to collectively as "a catalyst component (A)".

DETAILED EXPLANATION OF THE INVENTION

Examples of the cyclopentadiene type anion skeleton-carrying groups (hereinafter, these groups may be referred to as "Cp group", as the case maybe), and the substituted cyclopentadiene type anion skeleton-carrying groups (hereinafter, these groups may be referred to as "substituted Cp group", as the case may be), which groups are contained in the transition metal compounds (i), (ii) and (iii) used in the present invention, are an $\eta^5$-(substituted) cyclopentadienyl group, an $\eta^5$-(substituted) indenyl group and an $\eta^5$-(substituted) fluorenyl group. Here, the parenthesized term, "(substituted)", means "substituted or unsubstituted".

Specific examples of the Cp group and substituted Cp group are an $\eta^5$-cyclopentadienyl group, an $\eta^5$-methylcyclopentadienyl group, an $\eta^5$-ethylcyclopentadienyl group, an $\eta^5$-propylcyclopentadienyl group, an $\eta^5$-butylcyclopentadienyl group, $\eta^5$-hexylcyclopentadienyl group, an $\eta^5$-octylcyclopentadienyl group, an $\eta^5$-dimethylcyclopentadienyl group, an $\eta^5$-butylmethylcyclopentadienyl group, an $\eta^5$-methylpropylcyclopentadienyl group, an $\eta^5$-diethylcyclopentadienyl group, an $\eta^5$-trimethylcyclopentadienyl group, an $\eta^5$-tetramethylcyclopentadienyl group, an $\eta^5$-pentamethylcyclopentadienyl group, an $\eta^5$-indenyl group, an $\eta^5$-4,5,6,7-tetrahydroindenyl group, an $\eta^5$-methylindenyl group, an $\eta^5$-butylindenyl group, an $\eta^5$-dimethylindenyl group, an $\eta^5$-trimethylindenyl group, an $\eta^5$-methylpropylindenyl group, an $\eta^5$-4,5-benzindenyl group, an $\eta^5$-methyl-4,5-benzindenyl group, an $\eta^5$-phenylindenyl group, an $\eta^5$-methylphenylindenyl group, an $\eta^5$-methylnaphthylindenyl group, an $\eta^5$-fluorenyl group, an $\eta^5$-dimethylfluorenyl group and an $\eta^5$-dibutylfluorenyl group, and those groups having one or more substituents.

Among these groups, with respect to di-substituted $\eta^5$-cyclopentadienyl groups such as an η⁵-dimethylcyclopentadienyl group, and tri-substituted η⁵-cyclopentadienyl groups such as an η⁵-trimethylcyclopentadienyl group, there are many groups having various isomeric structures due to the position of more than one substituent, for example, more than one methyl group. In the present invention, all of such groups having various isomeric structures are included. Similarly, poly-substituted η⁵-indenyl groups and poly-substituted η⁵-fluorenyl groups, which groups have more than one substituent, include all of groups having various isomeric structures. Alkyl groups such as a propyl group and a butyl group include alkyl groups having isomeric structures such as n-, iso-, sec- and tert-. In naming transition metal compounds, "η⁵-" may be omitted.

Examples of the "substituted cyclopentadiene type anion skeleton-carrying groups" contained in the transition metal compound (ii) are an η⁵-substituted cyclopentadienyl group, an η⁵-(substituted) indenyl group and an η⁵-(substituted) fluorenyl group. Specific examples thereof are those mentioned above excluding an η⁵-cyclopentadienyl group.

Two Cp groups in the transition metal compounds (i) and (iii) are linked with each other directly or through a bridging group. Preferable examples of the bridging group are divalent bridging groups containing a carbon atom, a silicon atom, a nitrogen atom, an oxygen atom, a sulfur atom or a phosphorus atom. Among them, a preferable number of atoms contained in the bridging group is not more than 3, wherein (i) said number means a number of atoms present on a line linking two Cp groups, and (ii) when the bridging group has any branch, an atom contained in the branch is not counted. Preferable examples of the bridging group are alkylene groups such as an ethylene group and a propylene group; substituted alkylene groups such as a dimethylmethylene group and a diphenylmethylene group; a silylene group; substituted silylene groups such as a dimethylsilylene group, a diphenylsilylene group and a tetramethyldisilylene group; and hetero atoms such as a nitrogen atom, an oxygen atom, a sulfur atom and a phosphorus atom. Of these, a methylene group, an ethylene-group, a dimethylmethylene group (an isopropylidene group), a dimethylsilylene group, a diethylsilylene group or a diphenylsilene group is particularly preferred.

A preferable example of the transition metal compound (i) used in the present invention is a compound represented by the following formula [4]. In this formula, L² is a Cp group or a substituted Cp group; two L²'s may be the same or different from each other; two L²'s are linked with each other directly or through a bridging group; and X¹ is a halogen atom, a hydrocarbon group or a hydrocarbyloxy group.

$$L^2{}_2HfX^1{}_2 \quad [4]$$

The cyclopentadiene type anion skeleton-carrying group represented by L² is as explained above, and preferable examples thereof are an η⁵-indenyl group and an η⁵-alkyl substituted indenyl group.

Compounds represented by the above formula [4] are those, whose two L²'s are linked with each other directly or through a bridging group containing a carbon atom, a silicon atom, a nitrogen atom, an oxygen atom, a sulfur atom or a phosphorus atom. Such a bridging group is as explained above.

Preferable compounds represented by the above formula [4] are those, whose two L²'s are linked with each other through a bridging group containing a carbon atom, a silicon atom, a nitrogen atom, an oxygen atom, a sulfur atom or a phosphorus atom.

Examples of the halogen atom represented by X¹ in the above formula [4] are a fluorine atom, a chlorine atom, a bromine atom and an iodine atom. Examples of the hydrocarbon group represented by X¹ are an alkyl group, an aralkyl group and an aryl group. Of these, preferable are alkyl groups having 1 to 20 carbon atoms, aralkyl groups having 7 to 20 carbon atoms or aryl groups having 6 to 20 carbon atoms. The hydrocarbon group represented by X¹ contains neither the Cp group nor the substituted Cp group.

Examples of the above-mentioned alkyl group having 1 to 20 carbon atoms are a methyl group, an ethyl group, a n-propyl group, an isopropyl group, a n-butyl group, a sec-butyl group, a tert-butyl group, an isobutyl group, a n-pentyl group, a neopentyl group, an amyl group, a n-hexyl group, a n-octyl group, a n-decyl group, a n-dodecyl group, a n-pentadecyl group and a n-eicosyl group. Preferred are a methyl group, an ethyl group, an isopropyl group, a tert-butyl group, an isobutyl group and an amyl group.

The above-mentioned alkyl group may be substituted with a halogen atom such as a fluorine atom, a chlorine atom, a bromine atom and an iodine atom. Specific examples of the alkyl group, which group has 2 to 10 carbon atoms and is substituted with the halogen atom, are a fluoromethyl group, a trifluoromethyl group, a chloromethyl group, a trichloromethyl group, a fluoroethyl group, a pentafluoroethyl group, a perfluoropropyl group, a perfluorobutyl group, a perfluorohexyl group, a perfluorooctyl group, a perchloropropyl group, a perchlorobutyl group and a perbromopropyl group.

The above-mentioned alkyl group may be substituted with, for example, an alkoxy group such as a methoxy group and an ethoxy group; an aryloxy group such as a phenoxy group; or an aralkyloxy group such as a benzyloxy group.

Examples of the above-mentioned aralkyl group having 7 to 20 carbons are a benzyl group, a (2-methylphenyl) methyl group, a (3-methylphenyl)methyl group, a (4-methylphenyl) methyl group, a (2,3-dimethylphenyl)methyl group, a (2,4-dimethylphenyl)methyl group, a (2,5-dimethylphenyl) methyl group, a (2,6-dimethylphenyl)methyl group, a (3,4-dimethylphenyl)methyl group, a (3,5-dimethylphenyl) methyl group, a (2,3,4-trimethylphenyl)methyl group, a (2,3,5-trimethylphenyl)methyl group, a (2,3,6-trimethylphenyl)methyl group, a (3,4,5-trimethylphenyl) methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl) methyl group, an (ethylphenyl )methyl group, a (n-propylphenyl)methyl group, an (isopropylphenyl)methyl group, a (n-butylphenyl)methyl group, a (sec-butylphenyl) methyl group, a (tert-butylphenyl)methyl group, a (n-pentylphenyl)methyl group, a (neopentylphenyl)methyl group, a (n-hexylphenyl)methyl group, a (n-octylphenyl) methyl group, a (n-decylphenyl)methyl group, a (n-dodecylphenyl)methyl group, a naphthylmethyl group and an anthracenylmethyl group. Preferred is a benzyl group.

All of these aralkyl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the above-mentioned aryl group having 6 to 20 carbon atoms are a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group. Preferred is a phenyl group.

All of these aryl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the hydrocarbyloxy group of $X^1$ in the above formula [4] are an alkoxy group, an aralkyloxy group and an aryloxy group. Among them, preferable are alkoxy groups having 1 to 20 carbon atoms, aralkyloxy groups having 7 to 20 carbon atoms, and aryloxy groups having 6 to 20 carbon atoms.

Examples of the above-mentioned alkoxy group having 1 to 20 carbon atoms are a methoxy group, a n-ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group and an eicosoxy group. Preferred are a methoxy group, an ethoxy group, an isopropoxy group or a tert-butoxy group.

The above-mentioned alkoxy groups maybe substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the above-mentioned aralkyloxy group having 7 to 20 carbon atoms are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a naphthylmethoxy group and an anthracenylmethoxy group. Ppreferred is a benzyloxy group.

The above-mentioned aralkyloxy groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the above-mentioned aryloxy group having 6 to 20 carbon atoms are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 2,6-di-tert-butylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group and an anthracenoxy group.

The above-mentioned aryloxy groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

More preferable examples of $X^1$ are a chlorine atom, a methyl group, an ethyl group, a n-propyl group, an isopropyl group, a n-butyl group, a methoxy group, an ethoxy group, a n-propoxy group, an iso-propoxy group, a n-butoxy group, a trifluoromethoxy group, a phenyl group, a phenoxy group, a 2,6-di-tert-butylphenoxy group, a 3,4,5-trifluorophenoxy group, a pentafluorophenoxy group, a 2,3,5,6-tetrafluoro-4-pentafluorophenylphenoxy group and a benzyl group.

Examples of the compound represented by the above-mentioned formula [4] are ethylenebis(cyclopentadienyl)hafnium dichloride, ethylenebis(methylcyclopentadienyl)hafnium dichloride, ethylenebis(ethylcyclopentadienyl)hafnium dichloride, ethylenebis(propylcyclopentadienyl)hafnium dichloride, ethylenebis(butylcyclopentadienyl)hafnium dichloride, ethylenebis(hexylcyclopentadienyl)hafnium dichloride, ethylenebis(octylcyclopentadienyl)hafnium dichloride, ethylenebis(dimethylcyclopentadienyl)hafnium dichloride, ethylenebis(diethylcyclopentadienyl)hafnium dichloride, ethylenebis(ethylmethylcyclopentadienyl)hafnium dichloride, ethylenebis(butylmethylcyclopentadienyl)hafnium dichloride, ethylenebis(trimethylcyclopentadienyl)hafnium dichloride, ethylenebis(tetramethylcyclopentadienyl)hafnium dichloride, ethylenebis(indenyl)hafnium dichloride, ethylenebis(methylindenyl)hafnium dichloride, ethylenebis(4,5,6,7-tetrahydroindenyl)hafnium dichloride, ethylenebis(phenylindenyl)hafnium dichloride, ethylenebis(fluorenyl)hafnium dichloride, ethylene(cyclopentadienyl)

(tetramethylcyclopentadienyl)-hafnium dichloride, ethylene (cyclopentadienyl)(indenyl)-hafnium dichloride, ethylene (methylcyclopentadienyl)(indenyl)hafnium dichloride, ethylene(ethylcyclopentadienyl)(indenyl)hafnium dichloride, ethylene(propylcyclopentadienyl)(indenyl) hafnium dichloride, ethylene(butylcyclopentadienyl) (indenyl)hafnium dichloride, ethylene (hexylcyclopentadienyl)(indenyl)hafnium dichloride, ethylene(octylcyclopentadienyl)(indenyl)hafnium dichloride, ethylene(tetramethylcyclopentadienyl)(indenyl) hafnium dichloride, ethylene(cyclopentadienyl)(fluorenyl) hafnium dichloride, ethylene(methylcyclopentadienyl) (fluorenyl)hafnium dichloride, ethylene (tetramethylcyclopentadienyl)(fluorenyl)hafnium dichloride, ethylene(ethylcyclopentadienyl)(fluorenyl) hafnium dichloride, ethylene(propylcyclopentadienyl) (fluorenyl)hafnium dichloride, ethylene (butylcyclopentadienyl)(fluorenyl)hafnium dichloride, ethylene(hexylcyclopentadienyl)(fluorenyl)hafnium dichloride, ethylene(octylcyclopentadienyl)(fluorenyl) hafnium dichloride, and ethylene(indenyl)(fluorenyl) hafnium dichloride; compounds wherein the term "ethylene" in the above examples are changed to the term "isopropylidene", "dimethylsilylene", "diethylsilylene", "diphenylsilylene" or "dimethoxysilylene"; and compounds wherein the term "dichloride" in the above examples are changed to the term "difluoride", "dibromide", "diiodide", "dimethyl", "diethyl", "di-iso-propyl", "dimethoxide", "diethoxide", "dipropoxide", "dibutoxide", "bis (trifluoromethoxide)", "diphenyl", "diphenoxide", "bis(2,6-di-tert-butylphenoxide)", "bis(3,4,5-trifluorophenoxide)", "bis(pentafluorophenoxide)", "bis(2,3,5,6-tetrafluoro-4-pentafluorophenylphenoxide)" or "dibenzyl".

In the above-exemplified compounds, mono-$\eta^5$-cyclopentadienyl group-substituted compounds contain 2-substituted and 3-substituted compounds; di-$\eta^5$-cyclopentadienyl group-substituted compounds contain 2,3-di-substituted, 2,4-di-substituted, 2,5-di-substituted, 3,4-di-substituted, 3,5-di-substituted and 4,5-di-substituted compounds; and the tri-$\eta^5$-cyclopentadienyl group-substituted compounds contain 2,3,4-tri-substituted, 2,3,5-tri-substituted, 3,4,5-tri-substituted and 2,4,5-tri-substituted compounds. Similarly, mono-$\eta^5$-indenyl group-substituted compounds contain 2-substituted, 3-substituted, 4-substituted, 5-substituted, 6-substituted and 7-substituted compounds when a position of the bridging group is the 1-position; and also contain all possibilities when a position of the bridging group is any position other than the 1-position. Similarly, the di- or more $\eta^5$-indenyl group-substituted compounds contain all possibility of the combination of substituents and bridge positions. Similarly, the $\eta^5$-fluorenyl group-substituted compounds also contain all possibility of the combination of substituents and bridge positions. Alkyl groups such as a propyl group and a butyl group contain isomers such as n-, iso-, sec- and tert-. Alkoxy groups such as a propoxy group and a butoxy group contain isomers such as n-, iso-, sec- and tert-, unless otherwise specified. It is permitted to use the above-exemplified compound in a combination of two or more.

A preferable example of the transition metal compound (ii) used in the present invention is a compound represented by the following formula [5]. In this formula, $M^2$ is a titanium atom or a zirconium atom; $L^3$ is the substituted Cp group; two $L^3$'s are not linked with each other; and $X^2$ is a halogen atom, a hydrocarbon group or a hydrocarbyloxy group.

$$L^3{}_2M^2X^2{}_2 \qquad [5]$$

A substituted cyclopentadiene type anion skeleton-carrying group represented by $L^3$ is as explained above. Of these, an $\eta^5$-alkyl substituted cyclopentadienyl group is preferable. Two $L^3$'s in the above formula [5] are not bridged.

The same explanation as that given for $X^1$ in the above formula [4] can be applied for $X^2$ in the above formula [5].

Specific examples of the compound represented by the above formula [5] are bis (methylcyclopentadienyl)titanium dichloride, bis(ethylcyclopentadienyl)titanium dichloride, bis(propylcyclopentadienyl)titanium dichloride, bis (butylcyclopentadienyl)titanium dichloride, bis (hexylcyclopentadienyl)titanium dichloride, bis (octylcyclopentadienyl)titanium dichloride bis (dimethylcyclopentadienyl)titanium dichloride, bis (diethylcyclopentadienyl)titanium dichloride, bis (ethylmethylcyclopentadienyl)titanium dichloride, bis (methylbutylcyclopentadienyl)titanium dichloride, bis (trimethylcyclopentadienyl)titanium dichloride, bis (tetramethylcyclopentadienyl)titanium dichloride, bis (pentamethylcyclopentadienyl)titanium dichloride, bis (indenyl)titanium dichloride, bis(methylindenyl)titanium dichloride, bis(phenylindenyl)titanium dichloride, bis (methylfluorenyl)titanium dichloride, (methylcyclopentadienyl)(indenyl)titanium dichloride, (ethylcyclopentadienyl)(indenyl)titanium dichloride, (propylcyclopentadienyl)(indenyl)titanium dichloride, (butylcyclopentadienyl)(indenyl)titanium dichloride, (hexylcyclopentadienyl)(indenyl)titanium dichloride, (octylcyclopentadienyl)(indenyl)titanium dichloride, (tetramethylcyclopentadienyl)(indenyl)titanium dichloride, (methylcyclopentadienyl)(fluorenyl)titanium dichloride, (tetramethylcyclopentadienyl)(fluorenyl)titanium dichloride, (ethylcyclopentadienyl)(fluorenyl)titanium dichloride, (propylcyclopentadienyl)(fluorenyl)titanium dichloride, (butylcyclopentadienyl)(fluorenyl)titanium dichloride, (hexylcyclopentadienyl)(fluorenyl)titanium dichloride, (octylcyclopentadienyl)(fluorenyl)titanium dichloride, (pentamethylcyclopentadienyl)(fluorenyl) titanium dichloride and (indenyl)(fluorenyl)titanium dichloride; compounds formed by replacing "titanium" in the above-mentioned compounds with zirconium; and compounds formed by replacing "dichloride" in the above-mentioned compounds with difluoride, dibromide, diiodide, dimethyl, diethyl, diisopropyl, dimethoxide, diethoxide, dipropoxide, dibutoxide, bis(trifluoromethoxide), diphenyl, diphenoxide, bis(2,6-di-tert-butylphenoxide), bis(3,4,5-trifluorophenoxide), bis(pentafluorophenoxide), bis(2,3,5,6-tetrafluoro-4-pentafluorophenylphenoxide) or dibenzyl.

In the above-exemplified compounds, the di-$\eta^5$-cyclopentadienyl group-substituted compounds contain 1,2-di-substituted and 1,3-di-substituted compounds; and the tri-$\eta^5$-cyclopentadienyl group-substituted compounds contain 1,2,3-tri-substituted and 1,2,4-tri-substituted compounds. Similarly, the mono-$\eta^5$-indenyl group-substituted compounds contain 1-substituted, 2-substituted, 3-substituted, 4-substituted, 5-substituted, 6-substituted, 7-substituted compounds and their symmetric compounds. Similarly, the di- or more $\eta^5$-indenyl group-substituted compounds contain all combination. Similarly, the $\eta^5$-fluorenyl group-substituted compounds contain all combination. Alkyl groups such as a propyl group and a butyl group contain isomers such as n-, iso-, sec- and tert-isomers. Alkoxy groups such as a propoxy group and a butoxy group contain isomers such as n-, iso-, sec- and tert-isomers, unless otherwise specified. It is permitted to use the above-exemplified compound in a combination of two or more.

A preferable example of the transition metal compound (iii) used in the present invention is a compound represented by the following formula [6]. In this formula, $M^3$ is a titanium atom or a zirconium atom; $L^4$ is a Cp group or a substituted Cp group; two $L^4$'s are linked with each other directly or through a bridging group; and $X^3$ is a halogen atom, a hydrocarbon group or a hydrocarbyloxy group.

$$L^4{}_2M^3X^3{}_2 \qquad [6]$$

A substituted cyclopentadiene type anion skeleton-carrying group represented by $L^4$ is as explained above. Of these, an $\eta^5$-indenyl group or an $\eta^5$-alkyl substituted indenyl group is preferred.

The same bridging groups as those given for the above formula [4] can be applied for the above formula [6].

Compounds represented by the above formula [6] are those whose two $L^4$'s are linked with each other through a bridging group containing a carbon atom, a silicon atom, a nitrogen atom, an oxygen atom, a sulfur atom or a phosphorus atom.

The same explanation as that given for $X^1$ in the above formula [4] can be applied for $X^3$ in the above formula [6].

Specific examples of the compound represented by the above formula [6] are ethylenebis(cyclopentadienyl) titanium dichloride, ethylenebis(methylcyclopentadienyl) titanium dichloride, ethylenebis(ethylcyclopentadienyl) titanium dichloride, ethylenebis(propylcyclopentadienyl) titanium dichloride, ethylenebis(butylcyclopentadienyl) titanium dichloride, ethylenebis(hexylcyclopentadienyl) titanium dichloride, ethylenebis(octylcyclopentadienyl) titanium dichloride, ethylenebis(dimethylcyclopentadienyl) titanium dichloride, ethylenebis(diethylcyclopentadienyl) titanium dichloride, ethylenebis (ethylmethylcyclopentadienyl)titanium dichloride, ethylenebis(butylmethylcyclopentadienyl)titanium dichloride, ethylenebis(trimethylcyclopentadienyl)titanium dichloride, ethylenebis(tetramethylcyclopentadienyl) titanium dichloride, ethylenebis(indenyl)titanium dichloride, ethylenebis(methylindenyl)titanium dichloride, ethylenebis(4,5,6,7-tetrahydroindenyl)titanium dichloride, ethylenebis(phenylindenyl)titanium dichloride, ethylenebis(fluorenyl)titanium dichloride, ethylene(cyclopentadienyl)(tetramethylcyclopentadienyl)-titanium dichloride, ethylene(cyclopentadienyl)(indenyl)titanium dichloride, ethylene(methylcyclopentadienyl)(indenyl)titanium dichloride, ethylene(ethylcyclopentadienyl)(indenyl)titanium dichloride, ethylene(propylcyclopentadienyl)(indenyl) titanium dichloride, ethylene(butylcyclopentadienyl) (indenyl)titanium dichloride, ethylene (hexylcyclopentadienyl)(indenyl)titanium dichloride, ethylene(octylcyclopentadienyl)(indenyl)titanium dichloride, ethylene(tetramethylcyclopentadienyl)(indenyl) titanium dichloride, ethylene(cyclopentadienyl)(fluorenyl) titanium dichloride, ethylene(methylcyclopentadienyl) (fluorenyl)titanium dichloride, ethylene (tetramethylcyclopentadienyl)(fluorenyl)titanium dichloride, ethylene(ethylcyclopentadienyl)(fluorenyl) titanium dichloride, ethylene(propylcyclopentadienyl) (fluorenyl)titanium dichloride, ethylene (butylcyclopentadienyl)(fluorenyl)titanium dichloride, ethylene(hexylcyclopentadienyl)(fluorenyl)titanium dichloride, ethylene(octylcyclopentadienyl)(fluorenyl) titanium dichloride, and ethylene(indenyl)(fluorenyl) titanium dichloride; compounds formed by replacing "titanium" in the above-mentioned compounds with zirconium; compounds formed by replacing "ethylene" in the above-mentioned compounds with isopropylidene, dimethylsilylene, diethylsilylene, diphenylsilylene or dimethoxysilylene; and compounds formed by replacing "dichloride" in the above-mentioned compounds with difluoride, dibromide, diiodide, dimethyl, diethyl, diisopropyl, dimethoxide, diethoxide, dipropoxide, dibutoxide, bis(trifluoromethoxide), diphenyl, diphenoxide, bis(2,6-di-tert-butylphenoxide), bis(3,4,5-trifluorophenoxide), bis(pentafluorophenoxide), bis(2,3,5,6-tetrafluoro-4-pentafluorophenylphenoxide) or dibenzyl.

In the above-exemplified compounds, mono-$\eta^5$-cyclopentadienyl group-substituted compounds contain 2-substituted and 3-substituted compounds; di-$\eta^5$-cyclopentadienyl group-substituted compounds contain 2,3-di-substituted, 2,4-di-substituted, 2,5-di-substituted and 3,5-di-substituted compounds; and tri-$\eta^5$-cyclopentadienyl group-substituted compounds contain 2,3,4-tri-substituted and 2,3,5-tri-substituted compounds. Similarly, mono-$\eta^5$-indenyl group-substituted compounds contain 2-substituted, 3-substituted, 4-substituted, 5-substituted, 6-substituted and 7-substituted compounds when a position of the bridging group is the 1-position, and also contain all possibilities when a position of the bridging group is any position other than the 1-position. Similarly, the di- or more $\eta^5$-indenyl group-substituted compounds contain all possibility of the combination of substituents and bridge positions. Similarly, the substituted $\eta^5$-fluorenyl group also contain all possibility of the combination of substituents and bridge positions. Alkyl groups such as a propyl group and a butyl group contain isomers such as n-, iso-, sec- and tert-isomers. Alkoxy groups such as a propoxy group and a butoxy group contain isomers such as n-, iso-, sec- and tert-isomers, unless otherwise specified. It is permitted to use the above-exemplified compound in a combination of two or more.

The co-catalyst component for activation used in the present invention is not particularly limited as far as it can activate the catalyst component (A) in accordance with the present invention. As the co-catalyst component for activation, the following compound (B), (C) or a combination thereof is preferable.

Compound (B)

At least one aluminum compound selected from the group consisting of the following compounds (B1) to (B3).

Compound (B1): an organoaluminum compound represented by the formula, $E^1{}_aAlZ_{3-a}$.

Compound (B2): a cyclic aluminoxane represented by the formula, $\{-Al(E^2)-O-\}_b$.

Compound (B3): a linear aluminoxane represented by the formula, $E^3\{-Al(E^3)-O-\}_cAlE^3{}_2$.

In the above formulas, $E^1$, $E^2$ and $E^3$ are independently of one another a hydrocarbon group; all $E^1$, all $E^2$ and all $E^3$ may be the same or different, respectinely; Z is a hydrogen atom or a halogen atom; all Z may be the same or different; a is a number satisfying $0<a\leq3$; b is an integer of not less than 2; and c is an integer of not less than 1.

Compound (C)

At least one boron compound selected from the group consisting of the following compounds (C1) to (C3).

Compound (C1): a boron compound represented by the formula, $BQ^1Q^2Q^3$.

Compound (C2): a boron compound represented by the formula, $G^+(BQ^1Q^2Q^3Q^4)^-$.

Compound (C3): a boron compound represented by the formula, $(L-H)^+(BQ^1Q^2Q^3Q^4)^-$.

In the above formulas, B is a trivalent boron atom; $Q^1\sim Q^4$ may be the same or different and are a halogen atom, a hydrocarbon group, a halogenated hydrocarbon group, a substituted silyl group, an alkoxy group or a di-substituted amino group; G⁺ is an inorganic or organic cation; L is a neutral Lewis base; and (L-H)⁺ is a Broensted acid.

Examples of the above-mentioned compounds (B1) are trialkylaluminums such as trimethylaluminum, triethylaluminum, tripropylaluminum, triisobutylaluminum, trihexylaluminum and trioctylaluminum; dialkylaluminum chlorides such as dimethylaluminum chloride, diethylaluminum chloride, dipropylaluminum chloride, diisobutylaluminum chloride and dihexylaluminum chloride; alkylaluminum dichlorides such as methylaluminum dichloride, ethylaluminum dichloride, propylaluminum dichloride, isobutylaluminum dichloride and hexylaluminum dichloride; and dialkylaluminum hydrides such as dimethylaluminum hydride, diethylaluminum hydride, dipropylaluminum hydride, diisobutylaluminum hydride and dihexylaluminum hydride. Among them, preferred are trialkylaluminums such as trimethylaluminum, triethylaluminum, tri-n-butylaluminum, triisobutylaluminum, tri-n-hexylaluminum and tri-n-octylaluminum, and particularly preferred is triisobutylaluminum or tri-n-octylaluminum.

Examples of $E^2$ and $E^3$ in the formulas representing the compounds (B2) and (B3) are alkyl groups such as a methyl group, an ethyl group, a n-propyl group, an isopropyl group, a n-butyl group, an isobutyl group, a n-pentyl group and a neopentyl group. Of these, a methyl group or an isobutyl group are preferable. Preferred b is from 2 to 40, and preferred c is from 1 to 40.

A process for producing the above-mentioned aluminoxane is not particularly limited. There are exemplified (1) a conventional process comprising the step of (i) dissolving a trialkylaluminum such as trimethylaluminum in an organic solvent such as benzene, toluene and an aliphatic hydrocarbon and (ii) contacting the resulting solution with water, and (2) another conventional process comprising the step of (i) contacting a trialkylaluminum such as trimethylaluminum with a crystal water-carrying metal salt such as copper sulfate hydrate. The aluminoxane obtained according to these processes is usually considered to be a mixture of a cyclic aluminoxane and a linear aluminoxane.

An example of $Q^1$ to $Q^4$ in the above-mentioned compounds (C1) to (C3) is preferably a halogen atom, a hydrocarbon group having 1 to 20 carbon atoms, a halogenated hydrocarbon group having 1 to 20 carbon atoms, a substituted silyl group having 1 to 20 carbon atoms, an alkoxy group having 1 to 20 carbon atoms or an amino group having 2 to 20 carbon atoms; more preferably a halogen atom, a hydrocarbon group having 1 to 20 carbon atoms or a halogenated hydrocarbon group having 1 to 20 carbon atoms; much more preferably a fluorinated hydrocarbon group having at least one fluorine atom and 1 to 20 carbon atoms; and particularly preferably a fluorinated aryl group having at least one fluorine atom and 6 to 20 carbon atoms.

Examples of the above-mentioned compound (C1) are tris(pentafluorophenyl)borane, tris(2,3,5,6-tetrafluorophenyl)borane, tris(2,3,4,5-tetrafluorophenyl) borane, tris(3,4,5-trifluorophenyl)borane, tris(2,3,4-trifluorophenyl)borane and phenylbis(pentafluorophenyl) borane. Of these, tris(pentafluorophenyl)borane is the most preferable.

Examples of G⁺ in the above-mentioned compound (C2) are inorganic cations such as a ferrocenium cation, an alkyl substituted ferrocenium cation and a silver cation, and organic cations such as a triphenylmethyl cation. As the cation, a carbonium cation is preferable and a triphenylmethyl cation is particularly preferable.

Examples of $(BQ^1Q^2Q^3Q^4)^-$ in the above-mentioned compound (C2) are teraxis(pentafluorophenyl)borate, teraxis(2,3,5,6-terafluorophenyl)borate, teraxis(2,3,4,5-tetrafluorophenyl)borate, teraxis(3,4,5-trifluorophenyl) borate, teraxis(2,3,4-trifluorophenyl)borate, phenyltris (pentafluorophenyl)borate and teraxis(3,5-bistrifluoromethylphenyl)borate.

Examples of the above-mentioned compound (C2) are ferrocenium teraxis(pentafluorophenyl)borate, 1,1'-dimethylferrocenium teraxis(pentafluorophenyl)borate, silver teraxis(pentafluorophenyl)borate, triphenylmethyl teraxis(pentafluorophenyl)borate and triphenylmethyl teraxis(3,5-bistrifluoromethylphenyl)borate. Of these, triphenylmethyl teraxis(pentafluorophenyl)borate is the most preferred.

Examples of (L-H)⁺ in the above-mentioned compound (C3) are a trialkyl substituted ammonium, an N,N-dialkylanilinium, a dialkylammonium and a triarylphosphonium. Examples of the $(BQ^1Q^2Q^3Q^4)^-$ are the same as mentioned above.

Examples of the above-mentioned compound (C3) are triethylammonium teraxis(pentafluorophenyl)borate, tripropylammonium teraxis(pentafluorophenyl)borate, tri(n-butyl)ammonium teraxis(pentafluorophenyl)borate, tri(n-butyl)ammonium teraxis(3,5-bistrifluoromethylphenyl) borate, N,N-dimethylanilinium teraxis(pentafluorophenyl) borate, N,N-diethylanilinium teraxis(pentafluorophenyl) borate, N,N-2,4,6-pentamethylanilinium teraxis (pentafluorophenyl)borate, N,N-dimethylanilinium teraxis (3,5-bistrifluoromethylphenyl)borate, diisopropylammonium teraxis(pentafluorophenyl)borate, dicyclohexylammonium teraxis(pentafluorophenyl)borate, triphenylphosphonium teraxis(pentafluorophenyl)borate, tri (methylphenyl)phosphonium teraxis(pentafluorophenyl) borate and tri(dimethylphenyl)phosphonium teraxis (pentafluorophenyl)borate. Of these, tri(n-butyl)ammonium teraxis(pentafluorophenyl)borate or N,N-dimethylanilinium teraxis(pentafluorophenyl)borate is the most preferable.

A method for contacting the catalyst component (A) with the co-catalyst component for activation in the process for producing a catalyst for addition polymerization in accordance with the present invention is not particularly limited, as far as the catalyst for addition polymerization can be produced. There are exemplified (1) a method comprising the steps of (i) mixing the relevant components diluted with a solvent or not with each other, and (ii) feeding the resulting mixture to a polymerization vessel; and (2) a method comprising the steps of (i) feeding the relevant components separately into a polymerization vessel, and (ii) contacting them in the vessel. When at least two kinds of the co-catalyst component for activation are used in the former method, it is permitted that a part of said component and the catalyst component (A) are mixed and the remaining part is supplied as it is to a polymerization vessel.

The co-catalyst component for activation and the catalyst component (A) are used in an amount of usually from 0.1 to 10000, and preferably from 5 to 2000 in terms of a molar ratio of the above-mentioned compound (B)/the catalyst component (A); and used in an amount of usually from 0.01 to 100, and preferably from 0.5 to 10 in terms of a molar ratio of the above-mentioned compound (C)/the catalyst component (A).

When the catalyst component (A) and the co-catalyst component for activation are fed into a polymerization reactor in a form of a solution, a suspension or a slurry, it is permitted to appropriately determine a concentration thereof depending upon a feeding method. A concentration of the catalyst component (A) is usually from 0.0001 to 1000 mmol/liter, preferably from 0.05 to 200 mmol/liter, and more preferably from 0.01 to 50 mmol/liter; a concentration of the compound (B) is usually from 0.01 to 5000 mmol/liter, preferably from 0.1 to 2500 mmol/liter, and more preferably from 0.1 to 2000 mmol/liter as a total amount of Al atom contained in the compound (B) used; and a concentration of the compound (C) is usually from 0.001 to 500 mmol/liter, preferably from 0.01 to 250 mmol/liter, and more preferably from 0.05 to 100 mmol/liter.

When the catalyst component (A) and the above-mentioned compound (B) are contacted with each other to obtain the catalyst for addition polymerization, the compound (B2), the compound (B3) or a combination thereof is preferable as the compound (B). When the catalyst component (A), the above-mentioned compound (B) and the above-mentioned compound (C) are contacted with one another to obtain the catalyst for addition polymerization, the compound (B1) is preferable as the compound (B).

A polymerization method in the process for producing an addition polymer in accordance with the present invention is not particularly limited. There are exemplified (1) a solution polymerization method using an aliphatic hydrocarbon such as butane, pentane, hexane, heptane and octane; an aromatic hydrocarbon such as benzene and toluene; or a halogenated hydrocarbon such as methylene dichloride, (2) a slurry polymerization method using said solvent, and (3) a gas phase polymerization method comprising the step of polymerizing a gaseous monomer. A polymerization manner may be a continuous polymerization or a batch polymerization.

A polymerization temperature is usually from −50° C. to 200° C., and particularly preferably from −20° C. to 100° C. A preferable polymerization pressure is usually from atmospheric pressure to 6 MPa. A polymerization time can be appropriately determined depending upon a kind of a polymer obtained and a polymerization reaction apparatus, and is usually from 1 minute to 20 hours. It is permitted to use a chain transfer agent such as hydrogen to regulate a molecular weight of a polymer obtained.

When the catalyst component (A) is used, for example, in such a polymerization method as a slurry polymerization method, a gas phase polymerization method and a bulk polymerization method, which methods give a particulate addition polymer, the following particle (I) or particle (II), which can be obtained by modifying a particle (d) mentioned hereinafter, is preferable as the co-catalyst component for activation. Hereinafter, the particle (I) and the particle (II) are referred to collectively as "particle (D)".

Particle (I): a particle obtained by contacting the following compound (a), the following compound (b), the following compound (c) and a particle (d) mentioned hereinafter with one another.

Compound (a): a compound represented by the following formula [1],

$$M^1L^1_m \quad [1],$$

Compound (b): a compound represented by the following formula [2],

$$R^1_{t-1}TH \quad [2], \text{ and}$$

Compound (c): a compound represented by the following formula [3],

$$R^2_{t-2}TH_2 \quad [3].$$

In the above formulas [1] to [3], $M^1$ is a typical metal atom of the Group 1, 2, 12, 14 or 15 of the periodic table (Revised edition of IUPAC Inorganic Chemistry Nomenclature 1989); m is a number corresponding to a valence of $M^1$; $L^1$ is a hydrogen atom, a halogen atom or a hydrocarbon group, and when more than one $L^1$ exists, they may be the same or different from one another; $R^1$ is an electron-withdrawing group or an electron-withdrawing group-containing group, and when more than one $R^1$ exists, they may be the same or different from one another; $R^2$ is a hydrocarbon group or a halogenated hydrocarbon group; respective T's are independently of each other a non-metal atom of the Group 15 or 16 of the periodic table (Revised edition of IUPAC Inorganic Chemistry Nomenclature 1989), and t is a number corresponding to a valence of the atom T.

Particle (II): a particle obtained by contacting an aluminoxane and a particle (d) mentioned hereinafter with each other.

Examples of $M^1$ in the above formula [1] are a lithium atom, a sodium atom, a potassium atom, a rubidium atom, a cesium atom, a beryllium atom, a magnesium atom, a calcium atom, a strontium atom, a barium atom, a zinc atom, a cadmium atom, a mercury atom, a germanium atom, a tin atom, a lead atom, an antimony atom and a bismuth atom. Of these, a typical metal atom of the Group 12 is particularly preferred, and a zinc atom is the most preferred.

Further, m in the above formula [1] is a number corresponding to a valence of $M^1$, and, for example, m is 2 when $M^1$ is a zinc atom.

Examples of the halogen atom as $L^1$ in the above formula [1] are a fluorine atom, a chlorine atom, a bromine atom and an iodine atom, and a preferable hydrocarbon group as $L^1$ is an alkyl group, an aryl group or an aralkyl group.

As said alkyl group, an alkyl group having 1 to 20 carbon atoms is preferable. Examples thereof a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a n-octyl group, a n-decyl group, a n-dodecyl group, a n-pentadecyl group and a n-eicosyl group. Among them, a methyl group, an ethyl group, an isopropyl group, a tert-butyl group or an isobutyl group is more preferable.

The alkyl group may be substituted with a halogen atom such as a fluorine atom, a chlorine atom, a bromine atom and an iodine atom. Specific examples of the alkyl group substituted with a halogen atom are a fluoromethyl group, a difluoromethyl group, a trifluoromethyl group, a chloromethyl group, a dichloromethyl group, a trichloromethyl group, a bromomethyl group, a dibromomethyl group, a tribromomethyl group, an iodomethyl group, a diiodomethyl group, a triiodomethyl group, a fluoroethyl group, a difluoroethyl group, a trifluoroethyl group, a tetrafluoroethyl group, a pentafluoroethyl group, a chloroethyl group, a dichloroethyl group, a trichloroethyl group, a tetrachloroethyl group, a pentachloroethyl group, a bromoethyl group, a dibromoethyl group, a tribromoethyl group, a tetrabromoethyl group, a pentabromoethyl group, a perfluoropropyl group, a perfluorobutyl group, a perfluoropentyl group, a perfluorohexyl group, a perfluorooctyl group, a perfluorododecyl group, a perfluoropentadecyl group, a perfluoroeicosyl group, a perchloropropyl group, a perchlorobutyl group, a perchloropentyl group, a perchlorohexyl group, a perchlorooctyl group, a perchlorododecyl group, a perchloropentadecyl group, a perchloroeicosyl group, a perbromopropyl group, a perbromobutyl group, a perbromopentyl group, a perabromohexyl group, a perbromooctyl group, a perbromodecyl group, a perbromopentadecyl group and a perbromoeicosyl group.

A part of the alkyl group may be substituted with an alkoxy group such as a methoxy group and an ethoxy group; an aryloxy group such as a phenoxy group; or an aralkyloxy group such as a benzyloxy group.

As the above-mentioned aryl group, an aryl group having 6 to 20 carbon atoms is preferable. Examples thereof are a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group. Among them, more preferred is a phenyl group.

All of these aryl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

As the above-mentioned aralkyl group, an aralkyl group having 7 to 20 carbons is preferable. Examples thereof are a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl) methyl group, a (2,6-dimethylphenyl)methyl group, a (3,4-dimethylphenyl)methyl group, a (3,5-dimethylphenyl) methyl group, a (2,3,4-tri methylphenyl)methyl group, a (2,3,5-trimethylphenyl)methyl group, a (2,3,6-trimethylphenyl)methyl group, a (3,4,5-trimethylphenyl) methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl) methyl group, an (ethylphenyl)methyl group, a (n-propylphenyl)methyl group, an (isopropylphenyl)methyl group, a (n-butylphenyl)methyl group, a (sec-butylphenyl) methyl group, a (tert-butylphenyl)methyl group, a (n-pentylphenyl)methyl group, a (neopentylphenyl)methyl group, a (n-hexylphenyl)methyl group, a (n-octylphenyl) methyl group, a (n-decylphenyl)methyl group, a (n-dodecylphenyl)methyl group, a naphthylmethyl group and an anthracenylmethyl group. Among them, more preferred is a benzyl group.

All of these aralkyl groups may be partially substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

An example of $L^1$ in the above formula [1] is preferably a hydrogen atom, an alkyl group or an aryl group, more preferably a hydrogen atom or an alkyl group, and particularly preferably an alkyl group.

T in the above formula [2] and T in the above formula [3] may be the same or different from each other. Examples of the non-metal atom of the Group 15 are atoms such as a nitrogen atom and a phosphorus atom. Examples of the non-metal atom of the Group 16 are atoms such as an oxygen atom and a sulfur atom. Preferable T's are independently of each other a nitrogen atom or an oxygen atom, and particularly preferably an oxygen atom.

As an index of the electron-withdrawing property of $R^1$ in the above formula [2], for example, a substituent constant σ of Hammett's rule is known. Examples of the electron-withdrawing group are functional groups having a positive substituent constant σ of Hammett's rule.

Specific examples of the electron-withdrawing group are a fluorine atom, a chlorine atom, a bromine atom, an iodine atom, a cyano group, a nitro group, a carbonyl group, a sulfone group and a phenyl group. Examples of the electron-withdrawing group-containing group are a halogenated alkyl group, a halogenated aryl group, a (halogenated alkyl)aryl group, a cyanated aryl group, a nitrated aryl group and an ester group (for example, an alkoxycabonyl group, an aralkyloxycabonyl group and an aryloxycabonyl group).

Specific examples of the above-mentioned halogenated alkyl group are a fluoromethyl group, a chloromethyl group, a bromomethyl group, an iodomethyl group, a difluoromethyl group, a dichloromethyl group, a dibromomethyl group, a diiodomethyl group, a trifluoromethyl group, a trichloromethyl group, a tribromomethyl group, a triiodomethyl group, a 2,2,2-trifluoroethyl group, a 2,2,2-trichloroethyl group, a 2,2,2-tribromoethyl group, a 2,2,2-triiodoethyl group, a 2,2,3,3,3-pentafluoropropyl group, a 2,2,3,3,3-pentachloropropyl group, a 2,2,3,3,3-pentabromopropyl group, a 2,2,3,3,3-pentaiodopropyl group, a 2,2,2-trifluoro-1-trifluoromethylethyl group, a 2,2,2-trichloro-1-trichloromethylethyl group, a 2,2,2-tribromo-1-tribromomethylethyl group, a 2,2,2-triiodo-1-triiodomethylethyl group, a 1,1-bis(trifluoromethyl)-2,2,2-trifluoroethyl group, a 1,1-bis(trichloromethyl)-2,2,2-trichloroethyl group, a 1,1-bis(tribromomethyl)-2,2,2-tribromoethyl group and a 1,1-bis(triiodomethyl)-2,2,2-triiodoethyl group.

Specific examples of the above-mentioned halogenated aryl group are a 2-fluorophenyl group, a 3-fluorophenyl group, a 4-fluorophenyl group, a 2,4-difluorophenyl group, a 2,6-difluorophenyl group, a 3,4-difluorophenyl group, a 3,5-difluorophenyl group, a 2,4,6-trifluorophenyl group, a 3,4,5-tifluorophenyl group, a 2,3,5,6-tetrafluorophenyl group, a pentafluorophenyl group, a 2,3,5,6-tetrafluoro-4-trifluoromethylphenyl group, a 2,3,5,6-tetrafluoro-4-pentafluorophenylphenyl group, a perfluoro-1-naphthyl group, a perfluoro-2-naphthyl group, a 2-chlorophenyl group, a 3-chlorophenyl group, a 4-chlorophenyl group, a 2,4-dichlorophenyl group, a 2,6-dichlorophenyl group, a 3,4-dichlorophenyl group, a 3,5-dichlorophenyl group, a 2,4,6-trichlorophenyl group, a 3,4,5-trichlorophenyl group, a 2,3,5,6-tetrachlorophenyl group, a pentachlorophenyl group, a 2,3,5,6-tetrachloro-4-trichloromethylphenyl group, a 2,3,5,6-tetrachloro-4-pentachlorophenylphenyl group, a perchloro-1-naphthyl group, a perchloro-2-naphthyl group, a 2-bromophenyl group, a 3-bromophenyl group, a 4-bromophenyl group, a 2,4-dibromophenyl group, a 2,6-dibromophenyl group, a 3,4-dibromophenyl group, a 3,5-dibromophenyl group, a 2,4,6-tribromophenyl group, a 3,4,5-tribromophenyl group, a 2,3,5,6-tetrabromophenyl group, a pentabromophenyl group, a 2,3,5,6-tetrabromo-4-tribromomethylphenyl group, a 2,3,5,6-tetrabromo-4-pentabromophenylphenyl group, a perbromo-1-naphthyl group, a perbromo-2-naphthyl group, a 2-iodophenyl group, a 3-iodophenyl group, a 4-iodophenyl group, a 2,4-diiodophenyl group, a 2,6-diiodophenyl group, a 3,4-diiodophenyl group, a 3,5-diiodophenyl group, a 2,4,6-triiodophenyl group, a 3,4,5-triiodophenyl group, a 2,3,5,6-tetraiodophenyl group, a pentaiodophenyl group, a 2,3,5,6-tetraiodo-4-triiodomethylphenyl group, a 2,3,5,6-tetraiodo-4-pentaiodophenylphenyl group, a periodo-1-naphthyl group and a periodo-2-naphthyl group.

Specific examples of the above-mentioned (halogenated alkyl)aryl group are a 2-(trifluoromethyl)phenyl group, a 3-(trifluoromethyl)phenyl group, a 4-(trifluoromethyl) phenyl group, a 2,6-bis(trifluoromethyl)phenyl group, a 3,5-bis(trifluoromethyl)phenyl group, a 2,4,6-tris (trifluoromethyl)phenyl group and a 3,4,5-tris (trifluoromethyl)phenyl group.

Specific examples of the above-mentioned cyanated aryl group are a 2-cyanophenyl group, a 3-cyanophenyl group and a 4-cyanophenyl group.

Specific examples of the above-mentioned nitrated aryl group are a 2-nitrophenyl group, a 3-nitrophenyl group and a 4-nitrophenyl group.

Specific examples of the above-mentioned ester group are a methoxycarbonyl group, an ethoxycarbonyl group, a n-propoxycarbonyl group, an isopropoxycarbonyl group, a phenoxycarbonyl group, a trifluoromethoxycarbonyl group and a pentafluorophenoxycarbonyl group.

As $R^1$ in the above formula [2], preferred is a halogenated hydrocarbon group, and more preferred is a halogenated alkyl group or a halogenated aryl group. Much more preferred is a fluoromethyl group, a difluoromethyl group, a trifluoromethyl group, a 2,2,2-trifluoroethyl group, a 2,2,3,3,3-pentafluoropropyl group, a 2,2,2-trifluoro-1-trifluoromethylethyl group, a 1,1-bis(trifluoromethyl)-2,2,2-trifluoroethyl group, a 2-fluorophenyl group, a 3-fluorophenyl group, a 4-fluorophenyl group, a 2,4-difluorophenyl group, a 2,6-difluorophenyl group, a 3,4-difluorophenyl group, a 3,5-difluorophenyl group, a 2,4,6-trifluorophenyl group, a 3,4,5-trifluorophenyl group, a 2,3,5,6-tetrafluorophenyl group, a pentafluorophenyl group, a 2,3,5,6-tetrafluoro-4-trifluoromethylphenyl group, a 2,3,5,6-tetrafluoro-4-pentafluorophenylphenyl group, a perfluoro-1-naphtyl group, a perfluoro-2-naphtyl group, a chloromethyl group, a dichloromethyl group, a trichloromethyl group, a 2,2,2-trichloroethyl group, a 2,2,3,3,3-pentachloropropyl group, a 2,2,2-trichloro-1-trichloromethylethyl group, a 1,1-bis(trichloromethyl)-2,2,2-trichloroethyl group, a 4-chlorophenyl group, a 2,6-dichlorophenyl group, a 3,5-dichlorophenyl group, a 2,4,6-trichlorophenyl group, a 3,4,5-trichlorophenyl group, or a pentachlorophenyl group. Particularly preferred is a fluoroalkyl group or a fluoroaryl group, and the most preferred is a trifluoromethyl group, a 2,2,2-trifluoro-1-trifluoromethylethyl group, a 1,1-bis(trifluoromethyl)-2,2,2-trifluoroethyl group, a 3,5-difluorophenyl group, a 3,4,5-trifluorophenyl group, or a pentafluorophenyl group.

A preferable example of the hydrocarbon group as $R^2$ in the above formula [3] is an alkyl group, an aryl group or an aralkyl group. Examples of the hydrocarbon group are the same as those exemplified as $L^1$ in the above formula [1]. Examples of the halogenated hydrocarbon group as $R^2$ are a halogenated alkyl group, a halogenated aryl group and a (halogenated alkyl)aryl group. Specific examples of these groups are the same as those exemplified for the halogenated alkyl, halogenated aryl and (halogenated alkyl)aryl groups as $R^1$ in the above formula [2].

A preferable example of $R^2$ in the above formula [3] is a halogenated hydrocarbon group, and a fluorinated hydrocarbon group is more preferred.

Specific examples of the above-mentioned compound (a) having a zinc atom as $M^1$ are dialkylzincs such as dimethylzinc, diethylzinc, dipropylzinc, di-n-butylzinc, di-isobutylzinc and di-n-hexylzinc; diarylzincs such as diphenylzinc, dinaphthylzinc and bis(pentafluorophenyl) zinc; dialkenylzincs such as diallylzinc; bis(cyclopentadienyl)zinc; alkylzinc halides such as methylzinc chloride, ethylzinc chloride, propylzinc chloride, n-butylzinc chloride, isobutylzinc chloride, n-hexylzinc chloride, methylzinc bromide, ethylzinc bromide, propylzinc bromide, n-butylzinc bromide, isobutylzinc bromide, n-hexylzinc bromide, methylzinc iodide, ethylzinc iodide, propylzinc iodide, n-butylzinc iodide, isobutylzinc iodide and n-hexylzinc iodide; and zinc halides such as zinc fluoride, zinc chloride, zinc bromide and zinc iodide.

Dialkylzincs are preferred as the compound (a). More preferred is dimethylzinc, diethylzinc, dipropylzinc, di-n-butylzinc, di-isobutylzinc or di-n-hexylzinc, and particularly preferred is dimethylzinc or diethylzinc.

Specific examples of the above compound (b) as to amines are di(fluoromethyl)amine, di(chloromethyl)amine, di(bromomethyl)amine, di(iodomethyl)amine, bis (difluoromethyl)amine, bis(dichloromethyl)amine, bis (dibromomethyl)amine, bis(diiodomethyl)amine, bis (trifluoromethyl)amine, bis(trichloromethyl)amine, bis (tribromomethyl)amine, bis(triiodomethyl)amine, bis (2,2,2-trifluoroethyl)amine, bis(2,2,2-trichloroethyl)amine, bis (2,2,2-tribromoethyl)amine, bis(2,2,2-triiodoethyl)amine, bis(2,2,3,3,3-pentafluoropropyl)amine, bis(2,2,3,3,3-pentachloropropyl)amine, bis(2,2,3,3,3-pentabromopropyl) amine, bis(2,2,3,3,3-pentaiodopropyl)amine, bis(2,2,2-trifluoro-1-trifluoromethylethyl)amine, bis(2,2,2-trichloro-1-trichloromethylethyl)amine, bis(2,2,2-tribromo-1-tribromomethylethyl)amine, bis(2,2,2-triiodo-1-triiodomethylethyl)amine, bis(1,1-bis(trifluoromethyl)-2,2,2-trifluoroethyl)amine, bis(1,1-bis(trichloromethyl)-2,2,2-trichloroethyl)amine, bis(1,1-bis(tribromomethyl)-2,2,2-tribromoethyl)amine, bis(1,1-bis(triiodomethyl)-2,2,2-triiodoethyl)amine, bis(2-fluorophenyl)amine, bis(3-fluorophenyl)amine, bis(4-fluorophenyl)amine, bis(2-chlorophenyl)amine, bis(3-chlorophenyl)amine, bis(4-chlorophenyl)amine, bis(2-bromophenyl)amine, bis(3-bromophenyl)amine, bis(4-bromophenyl)amine, bis(2-iodophenyl)amine, bis(3-iodophenyl)amine, bis(4-iodophenyl)amine, bis(2,6-difluorophenyl)amine, bis(3,5-difluorophenyl)amine, bis(2,6-dichlorophenyl)amine, bis(3,5-dichlorophenyl)amine, bis(2,6-dibromophenyl)amine, bis (3,5-dibromophenyl)amine, bis(2,6-diiodophenyl)amine, bis(3,5-diiodophenyl)amine, bis(2,4,6-trifluorophenyl) amine, bis(2,4,6-trichlorophenyl)amine, bis(2,4,6-tribromophenyl)amine, bis(2,4,6-triiodophenyl)amine, bis (3,4,5-trifluorophenyl)amine, bis(3,4,5-trichlorophenyl) amine, bis(3,4,5-tribromophenyl)amine, bis(3,4,5-triiodophenyl)amine, bis(pentafluorophenyl)amine, bis (pentachlorophenyl)amine, bis(pentabromophenyl)amine, bis(pentaiodophenyl)amine, bis(2-(trifluoromethyl)phenyl) amine, bis(3-(trifluoromethyl)phenyl)amine, bis(4-(trifluoromethyl)phenyl)amine, bis(2,6-di(trifluoromethyl) phenyl)amine, bis(3,5-di(trifluoromethyl)phenyl)amine, bis (2,4,6-tri(trifluoromethyl)phenyl)amine, bis(2-cyanophenyl) amine, (3-cyanophenyl)amine, bis(4-cyanophenyl)amine, bis(2-nitrophenyl)amine, bis(3-nitrophenyl)amine and bis (4-nitrophenyl)amine. In addition, phosphine compounds having a phosphorus atom in place of the nitrogen atom are also exemplified. Such phosphine compounds are those expressed by replacing the term "amine" in the above-mentioned specific examples with the term "phosphine", respectively.

Specific examples of the above compound (b) as to alcohols are fluoromethanol, chloromethanol, bromomethanol, iodomethanol, difluoromethanol, dichloromethanol, dibromomethanol, diiodomethanol, trifluoromethanol, trichloromethanol, tribromomethanol, triiodomethanol, 2,2,2-trifluoroethanol, 2,2,2- trichloroethanol, 2,2,2-tribromoethanol, 2,2,2-triiodoethanol, 2,2,3,3,3-pentafluoropropanol, 2,2,3,3,3-pentachloropropanol, 2,2,3,3,3-pentabromopropanol, 2,2,3,3,3-pentaiodopropanol, 2,2,2-trifluoro-1-trifluoromethylethanol, 2,2,2-trichloro-1-trichloromethylethanol, 2,2,2-tribromo-1-tribromomethylethanol, 2,2,2-triiodo-1-triiodomethylethanol, 1,1-bis(trifluoromethyl)-2,2,2-trifluoroethanol, 1,1-bis(trichloromethyl)-2,2,2-trichloroethanol, 1,1-bis(tribromomethyl)-2,2,2-tribromoethanol and 1,1-bis(triiodomethyl)-2,2,2-triiodoethanol. In addition, thiol compounds having a sulfur atom in place of the oxygen atom are also exemplified. Such thiol compounds are those expressed by replacing the term "nol" in the above-mentioned specific examples with the term "nethiol", respectively.

Specific examples of the above compound (b) as to phenols are 2-fluorophenol, 3-fluorophenol, 4-fluorophenol, 2,4-difluorophenol, 2,6-difluorophenol, 3,4-difluorophenol, 3,5-difluorophenol, 2,4,6-trifluorophenol, 3,4,5-trifluorophenol, 2,3,5,6-tetrafluorophenol, pentafluorophenol, 2,3,5,6-tetrafluoro-4-trifluoromethylphenol, 2,3,5,6-tetrafluoro-4-pentafluorophenylphenol, perfluoro-1-naphthol, perfluoro-2-naphthol, 2-chlorophenol, 3-chlorophenol, 4-chlorophenol, 2,4-dichlorophenol, 2,6-dichlorophenol, 3,4-dichlorophenol, 3,5-dichlorophenol, 2,4,6-trichlorophenol, 3,4,5-trichlorophenol, 2,3,5,6-tetrachlorophenol, pentachlorophenol, 2,3,5,6-tetrachloro-4-trichloromethylphenol, 2,3,5,6-tetrachloro-4-pentachlorophenylphenol, perchloro-1-naphthol, perchloro-2-naphthol, 2-bromophenol, 3-bromophenol, 4-bromophenol, 2,4-dibromophenol, 2,6-dibromophenol, 3,4-dibromophenol, 3,5-dibromophenol, 2,4,6-tribromophenol, 3,4,5-tribromophenol, 2,3,5,6-tetrabromophenol, pentabromophenol, 2,3,5,6-tetrabromo-4-tribromomethylphenol, 2,3,5,6-tetrabromo-4-pentabromophenylphenol, perbromo-1-naphthol, perbromo-2-naphthol, 2-iodophenol, 3-iodophenol, 4-iodophenol, 2,4-diiodophenol, 2,6-diiodophenol, 3,4-diiodophenol, 3,5-diiodophenol, 2,4,6-triiodophenol, 3,4,5-triiodophenol, 2,3,5,6-tetraiodophenol, pentaiodophenol, 2,3,5,6-tetraiodo-4-triiodomethylphenol, 2,3,5,6-tetraiodo-4-pentaiodophenylphenol, periodo-1-naphthol, periodo-2-naphthol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol, 2-cyanophenol, 3-cyanophenol, 4-cyanophenol, 2-nitrophenol, 3-nitrophenoland 4-nitrophenol. In addition, thiophenol compounds having a sulfur atom in place of the oxygen atom are also exemplified. Such thiophenol compounds are those expressed by replacing the term "phenol" in the above-mentioned specific examples with the term "thiophenol", respectively.

Preferalbe examples of the compound (b) are, as to amines, bis(trifluoromethyl)amine, bis(2,2,2-trifluoromethyl)amine, bis(2,2,3,3,3-pentafluoropropyl) amine, bis(2,2,2-trifluoro-1-trifluoromethylethyl)amine, bis (1,1-bis(trifluoromethyl)-2,2,2-trifluoroethyl)amine or bis (pentafluorophenyl) amine; as to alcohols-, trifluoromethanol, 2,2,2-trifluoroethanol, 2,2,3,3,3-pentafluoropropanol, 2,2,2-trifluoro-1-trifluoromethylethanol or 1,1-bis(trifluoromethyl)-2,2,2-trifluoroethanol; and, as to phenols, 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol or 3,4,5-tris (trifluoromethyl)phenol.

More preferalbe examples of the compound (b) are bis (trifluoromethyl)amine, bis(pentafluorophenyl) amine, trifluoromethanol, 2,2,2-trifluoro-1-trifluoromethylethanol, 1,1-bis(trifluoromethyl)-2,2,2-trifluoroethanol, 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 4-(trifluoromethyl)phenol, 2,6-bis(trifluoromethyl)phenol and 2,4,6-tris(trifluoromethyl)phenol. Much more preferred are 3,5-difluorophenol, 3,4,5-trifluorophenol, pentafluorophenol and 1,1-bis(trifluoromethyl)-2,2,2-trifluoroethanol.

The compound (c) is preferably water, hydrogen sulfide, an alkylamine, an arylamine, an aralkylamine, a halogenated alkylamine, a halogenated arylamine or a (halogenated alkyl)arylamine; and further preferably water, hydrogen sulfide, methylamine, ethylamine, n-propylamine, isopropylamine, n-butylamine, sec-butylamine, tert-butylamine, isobutylamine, n-pentylamine, neopentylamine, isopentylamine, n-hexylamine, n-octylamine, n-decylamine, n-dodecylamine, n-pentadecylamine, n-eicosylamine, allylamine, cyclopentadienylamine, aniline, 2-tolylamine, 3-tolylamine, 4-tolylamine, 2,3-xylylamine, 2,4-xylylamine, 2,5-xylylamine, 2,6-xylylamine, 3,4-xylylamine, 3,5-xylylamine, 2,3,4-trimethylaniline, 2,3,5-trimethylaniline, 2,3,6-trimethylaniline, 2,4,6-trimethylaniline, 3,4,5-trimethylaniline, 2,3,4,5-tetramethylaniline, 2,3,4,6-tetramethylaniline, 2,3,5,6-tetramethylaniline, pentamethylaniline, ethylaniline, n-propylaniline, isopropylaniline, n-butylaniline, sec-butylaniline, tert-butylaniline, n-pentylaniline, neopentylaniline, n-hexylaniline, n-octylaniline, n-decylaniline, n-dodecylaniline, n-tetradecylaniline, naphthylamine, anthracenylamine, benzylamine, (2-methylphenyl)methylamine, (3-methylphenyl)methylamine, (4-methylphenyl)methylamine, (2,3-dimethylphenyl)methylamine, (2,4-dimethylphenyl)methylamine, (2,5-dimethylphenyl)methylamine, (2,6-dimethylphenyl)methylamine, (3,4-dimethylphenyl)methylamine, (3,5-dimethylphenyl)methylamine, (2,3,4-trimethylphenyl)methylamine, (2,3,5-trimethylphenyl)methylamine, (2,3,6-trimethylphenyl)methylamine, (3,4,5-trimethylphenyl)methylamine, (2,4,6-trimethylphenyl)methylamine, (2,3,4,5-tetramethylphenyl)methylamine, (2,3,4,6-tetramethylphenyl)methylamine, (2,3,5,6-tetramethylphenyl)methylamine, (pentamethylphenyl)methylamine, (ethylphenyl)methylamine, (n-propylphenyl)methylamine, (isopropylphenyl)methylamine, (n-butylphenyl)methylamine, (sec-butylphenyl)methylamine, (tert-butylphenyl)methylamine, (n-pentylphenyl)methylamine, (neopentylphenyl)methylamine, (n-hexylphenyl)methylamine, (n-octylphenyl)methylamine, (n-decylphenyl)methylamine, (n-tetradecylphenyl)methylamine, naphtylmethylamine, anthracenylmethylamine, fluoromethylamine, chloromethylamine, bromomethylamine, iodomethylamine, difluoromethylamine, dichloromethylamine, dibromomethylamine, diiodomethylamine, trifluoromethylamine, trichloromethylamine, tribromomethylamine, triiodomethylamine, 2,2,2-trifluoroethylamine, 2,2,2-trichloroethylamine, 2,2,2-tribromoethylamine, 2,2,2-triiodoethylamine, 2,2,3,3,3-pentafluoropropylamine, 2,2,3,3,3-pentachloropropylamine, 2,2,3,3,3-pentabromopropylamine, 2,2,3,3,3-pentaiodopropylamine, 2,2,2-trifluoro-1-trifluoromethylethylamine, 2,2,2-trichloro-1-trichloromethylethylamine, 2,2,2-tribromo-1-tribromomethylethylamine, 2,2,2-triiodo-1-triiodomethylethylamine, 1,1-bis(trifluoromethyl)-2,2,2-trifluoroethylamine, 1,1-bis(trichloromethyl)-2,2,2-trichloroethylamine, 1,1-bis(tribromomethyl)-2,2,2-tribromoethylamine, 1,1-bis(triiodomethyl)-2,2,2-triiodoethylamine, perfluoropropylamine, perchloropropylamine, perbromopropylamine, perfluorobutylamine, perchlorobutylamine, perbromobutylamine, perfluoropentylamine, perchloropentylamine, perbromopentylamine, perfluorohexylamine, perchlorohexylamine, perbromohexylamine, perfluorooctylamine, perchlorooctylamine, perbromooctylamine, perfluorododecylamine, perchlorododecylamine, perbrododecylamine, perfluoropentadecylamine, perchloropentadecylamine, perbromopentadecylamine, perfluoroeicosylamine, perchloroeicosylamine, perbromoeicosylamine, 2-fluoroaniline, 3-fluoroaniline, 4-fluoroaniline, 2-chloroaniline, 3-chloroaniline, 4-chloroaniline, 2-bromoaniline, 3-bromoaniline, 4-bromoaniline, 2-iodoaniline, 3-iodoaniline, 4-iodoaniline, 2,6-difluoroaniline, 3,5-difluoroaniline, 2,6-dichloroaniline, 3,5-dichloroaniline, 2,6-dibromoaniline, 3,5-dibromoaniline, 2,6-diiodoaniline, 3,5-diiodoaniline, 2,4,6-trifluoroaniline, 2,4,6-trichloroaniline, 2,4,6-tribromoaniline, 2,4,6-triiodoaniline, 3,4,5-trifluoroaniline, 3,4,5-trichloroaniline, 3,4,5-tribromoaniline, 3,4,5-triiodoaniline, pentafluoroaniline, pentachloroaniline, pentabromoaniline, pentaiodoaniline, 2-(trifluoromethyl)aniline, 3-(trifluoromethyl)aniline, 4-(trifluoromethyl)aniline, 2,6-di(trifluoromethyl)aniline, 3,5-di(trifluoromethyl)aniline, 2,4,6-tri(trifluoromethyl)aniline or 3,4,5-tri(trifluoromethyl)aniline.

The compound (c) is more preferably water, hydrogen sulfide, methylamine, ethylamine, n-propylamine, isopropylamine, n-butylamine, sec-butylamine, tert-butylamine, isobutylamine, n-octylamine, aniline, 2,6-xylylamine, 2,4,6-trimethylaniline, naphthylamine, anthracenylamine, benzylamine, trifluoromethylamine, pentafluoroethylamine, perfluoroproylamine, perfluorobutylamine, perfluoropentylamine, perfluorohexylamine, perfluorooctylamine, perfluorododecylamine, perfluoropentadecylamine, perfluoroeicosylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline, 2,4,6-tris(trifluoromethyl)aniline or 3,4,5-tris(trifluoromethyl)aniline; particularly preferably water, trifluoromethylamine, perfluorobutylamine, perfluorooctylamine, perfluoropentadecylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline, 2,4,6-tris(trifluoromethyl)aniline or 3,4,5-tris(trifluoromethyl)aniline; and most preferably water or pentafluoroaniline.

As the above-mentioned particle (d), those generally used as a carrier are preferable. Among them, porous substances having a uniform particle diameter are preferable. As the particle (d), an inorganic substance or an organic polymer is preferable. Of these, an inorganic substance is more preferable.

From a viewpoint of particle size distribution of an addition polymer obtained, the particle (d) has a geometric standard deviation of preferably not more than 2.5, more preferably not more than 2.0, and much more preferably not more than 1.7, wherein the geometric standard deviation is based on a volume of a particle diameter of the particle (d).

The above-mentioned inorganic substance is preferably inorganic oxides. It is also permitted to use an inorganic substance such as clay and clay mineral. These inorganic substances may be used in a mixture.

Specific examples of the inorganic oxide are $SiO_2$, $Al_2O_3$, MgO, $ZrO_2$, $TiO_2$, $B_2O_3$, CaO, ZnO, BaO and $ThO_2$; and a combination such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Among them, $SiO_2$, $Al_2O_3$ or $SiO_2$—$Al_2O_3$ is preferable, and $SiO_2$ (silica) is particularly preferable. The above inorganic oxide may contain a small amount of carbonates, sulfates, nitrates or oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Examples of the above-mentioned clay or clay mineral are kaolin, bentonite, Kibushi clay, gaerome clay, allophane, hisingerite, pyrophylite, talc, a mica group, a montmorillinite group, vermiculite, a chlorite group, palygorskite, kaolinite, nacrite, dickite and halloycite. Among these, smectite, montmorillonite, hectorite, raponite and saponite are preferable, and montmorillonite and hectorite are more preferable.

As the above-mentioned inorganic substance, an inorganic substance dried in a method such as heat-treatment method, and containing substantially no water is preferable. In case of inorganic substances whose water content cannot be visually confirmed, temperature of said heat-treatment method is usually from 100 to 1500° C., preferably from 100 to 1000° C., and more preferably from 200 to 800° C. Heating time is not particularly limited, and preferably from 10 minutes to 50 hours, and more preferably from 1 hour to 30 hours. Examples of said heat-treatment method are (i) heating while passing a dried inert gas such as nitrogen or argon at a constant flow rate, and (ii) heating under reduced pressure.

While an inorganic oxide has usually a hydroxyl group on its surface, it is permitted to use a modified inorganic oxide obtained by substituting an active hydrogen of said hydroxyl group with a various kind of a substituent. A preferable example of the substituent is a silyl group. Examples of a contact-treating agent, which agent is used for obtaining the modified inorganic oxide by contact-treating the inorganic oxide therewith, are trialkylchlorosilanes such as trimethylchlorosilane and tert-butyldimethylchlorosilane; triarylchlorosilanes such as triphenylchlorosilane; dialkyldichlorosilanes such as dimethyldichlorosilane; diaryldichlorosilanes such as diphenyldichlorosilane; alkyltrichlorosilanes such as methyltrichlorosilane; aryltrichlorosilanes such as phenyltrichlorosilane; trialkylalkoxysilanes such as trimethylmethoxysilane; triarylalkoxysilanes such as triphenylmethoxysilane; dialkyldialkoxysilanes such as dimethyldimethoxysilane; diaryldialkoxysilanes such as diphenyldimethoxysilane; alkyltrialkoxysilanes such as methyltrimethoxysilane; aryltrialkylsilanes such as phenyltrimethoxysilane; tetraalkoxysilanes such as tetramethoxysilane; alkyldisilazanes such as 1,1,1,3,3,3-hexamethyldisilazane; and tetrachlorosilane.

An average particle diameter of the particle (d) is preferably from 5 to 1000 $\mu$m, more preferably from 10 to 500

μm, and more preferably from 10 to 100 μm; a pore volume thereof is preferably not less than 0.1 ml/g, and more preferably 0.3 to 10 ml/g; and the specific surface area thereof is preferably from 10 to 1000 m$^2$/g, and more preferably from 100 to 500 m$^2$/g.

The above-mentioned organic polymer used as the particle (d) is not limited. It is permitted to use a combination of more than one organic polymer. As the organic polymer, a polymer having an active hydrogen-carrying functional group or a functional group of a non-proton-donating Lewis base is preferable.

The above-mentioned active hydrogen-carrying functional group is not particularly limited. Examples thereof are a primary amino group, a secondary amino group, an imino group, an amide group, a hydrazide group, an amidino group, a hydroxy group, a hydroperoxy group, a carboxyl group, a formyl group, a carbamoyl group, a sulfonic acid group, a sulfinic acid group, a sulfenic acid group, a thiol group, a thioformyl group, a pyrrolyl group, an imidazolyl group, a piperidyl group, an indazolyl group and a carbazolyl group. Among them, preferable is a primary amino group, a secondary amino group, an imino group, an amide group, an imide group, a hydroxy group, a formyl group, a carboxyl group, a sulfonic acid group or a thiol group; and particularly preferable is a primary amino group, a secondary amino group, an amide group or a hydroxy group. These groups may be substituted with a halogen atom or a hydrocarbon group having 1 to 20 carbon atoms.

The above-mentioned functional group of a non-proton-donating Lewis base is not particularly limited as far as it is a functional group having a Lewis base portion containing no active hydrogen atom. Specific examples thereof are a pyridyl group, an N-substituted imidazolyl group, an N-substituted indazolyl group, a nitrile group, an azido group, an N-substituted imino group, an N,N-substituted amino group, an N,N-substituted aminoxy group, an N,N, N-substituted hydrazino group, a nitroso group, a nitro group, a nitroxy group, a furyl group, a carbonyl group, a thiocarbonyl group, an alkoxy group, an alkyloxycarbonyl group, an N,N-substituted carbamoyl group, a thioalkoxy group, a substituted sulfinyl group, a substituted sulfonyl group and a substituted sulfonic acid group. Among them, preferable is a heterocyclic group; more preferable is an aromatic heterocyclic group having an oxygen atom and/or a nitrogen atom in the ring; particularly preferable is a pyridyl group, an N-substituted imidazolyl group or an N-substituted indazoyl group; and the most preferable is a pyridyl group. These groups may be substituted with a halogen atom or a hydrocarbon group having 1 to 20 carbon atoms.

The polymer having an active hydrogen-carrying functional group or a functional group of a non-proton-donating Lewis base is not particularly limited in an amount of such a functional group. The amount is preferably from 0.01 to 50 mmol/g, and more preferably from 0.1 to 20 mmol/g in terms of an amount by mol of the functional group per g of the polymer.

Examples of a process for producing the above-mentioned polymer are (i) a process comprising the step of homopolymerizing a monomer (M1) having both an active hydrogen-carrying functional group and at least one polymerizable unsaturated group, or having both a functional group of a non-proton-donating Lewis base and at least one polymerizable unsaturated group; and a process comprising the step of copolymerizing said monomer (M1) with another monomer (M2) having a polymerizable unsaturated group. It is recommendable to use these monomers in combination with a crosslinking-polymerizable monomer (M3) having at least two polymerizable unsaturated groups. Examples of the polymerizable unsaturated group are alkenyl groups such as a vinyl group and an allyl group, and alkynyl groups such as ethyne group.

Examples of the former monomer in the above monomer (M1) are a vinyl group-containing primary amine, a vinyl group-containing secondary amine, a vinyl group-containing amide compound and a vinyl group-containing hydroxy compound. Specific examples thereof are N-(1-ethenyl)amine, N-(2-propenyl)amine, N-(1-ethenyl)-N-methylamine, N-(2-propenyl)-N-methylamine, 1-ethenylamide, 2-propenylamide, N-methyl-(1-ethenyl) amide, N-methyl-(2-propenyl)amide, vinyl alcohol, 2-propen-1-ol and 3-buten-1-ol.

Examples of the latter monomer in the above-mentioned monomer (M1) are vinylpyridine, vinyl(N-substituted) imidazoles and vinyl(N-substituted)indazoles.

Examples of the above-mentioned monomer (M2) are ethylene, α-olefins and aromatic vinyl compounds. Specific examples thereof are ethylene, propylene, 1-butene, 1-hexene, 4-methyl-1-pentene and styrene. Of these, ethylene or styrene is preferable, and it is permitted to use a combination of two or more thereof.

Divinylbenzene can be exemplified as the above-mentioned monomer (M3).

An average particle diameter of the above-mentioned organic polymer is preferably from 5 to 1000 μm, and more preferably from 10 to 500 μm; a pore volume thereof is preferably not less than 0.1 ml/g, and more preferably 0.3 to 10 ml/g; and the specific surface area thereof is preferably from 10 to 1000 m$^2$/g, and more preferably from 50 to 500 m$^2$/g.

As the above-mentioned organic polymer, an organic polymer dried in a method such as heat-treatment method, and containing substantially no water is preferable. In case of organic polymers whose water content cannot be visually confirmed, temperature of said heat-treatment method is usually from 30 to 400° C., preferably from 50 to 200° C., and more preferably from 70 to 150° C. Heating time is not particularly limited, and preferably from 30 minutes to 50 hours, and more preferably from 1 hour to 30 hours. Examples of said heat-treatment method are (i) heating while passing a dried inert gas such as nitrogen or argon at a constant flow rate, and (ii) heating under reduced pressure.

A method for contacting the above-mentioned compound (a), compound (b), compound (c) and particle (d) with one another is not particularly limited. The following methods are exemplified. Of these, methods 1, 2, 5, 11 or 12 is preferable.

Method 1 Comprising the Steps of:
  (1) contacting the compound (a) with the compound (b) to obtain a contact product,
  (2) contacting said contact product with the compound (c) to obtain a second contact product, and
  (3) contacting said second contact product with the particle (d).

Method 2 Comprising the Steps of:
  (1) contacting the compound (a) with the compound (b) to obtain a contact product,
  (2) contacting said contact product with the particle (d) to obtain a second contact product, and
  (3) contacting said second contact product with the compound (c).

Method 3 Comprising the Steps of:
  (1) contacting the compound (a) with the compound (c) to obtain a contact product, (2) contacting said contact product with the compound (b) to obtain a second contact product, and (3) contacting said second contact product with the particle (d).

Method 4 Comprising the Steps of:

(1) contacting the compound (a) with the compound (c) to obtain a contact product, (2) contacting said contact product with the particle (d) to obtain a second contact product, and (3) contacting said second contact product with the compound (b).

Method 5 Comprising the Steps of:

(1) contacting the compound (a) with the particle (d) to obtain a contact product, (2) contacting said contact product with the compound (b) to obtain a second contact product, and (3) contacting said second contact product with the compound (c).

Method 6 Comprising the Steps of:

(1) contacting the compound (a) with the particle (d) to obtain a contact product, (2) contacting said contact product with the compound (c) to obtain a second contact product, and (3) contacting said second contact product with the compound (b).

Method 7 Comprising the Steps of:

(1) contacting the compound (b) with the compound (c) to obtain a contact product, (2) contacting said contact product with the compound (a) to obtain a second contact product, and (3) contacting said second contact product with the particle (d).

Method 8 Comprising the Steps of:

(1) contacting the compound (b) with the compound (c) to obtain a contact product, (2) contacting said contact product with the particle (d) to obtain a second contact product, and (3) contacting said second contact product with the compound (a).

Method 9 Comprising the Steps of:

(1) contacting the compound (b) with the particle (d) to obtain a contact product, (2) contacting said contact product with the compound (a) to obtain a second contact product, and (3) contacting said second contact product with the compound (c).

Method 10 Comprising the Steps of:

(1) contacting the compound (b) with the particle (d) to obtain a contact product, (2) contacting said contact product with the compound (c) to obtain a second contact product, and (3) contacting said second contact product with the compound (a).

Method 11 Comprising the Steps of:

(1) contacting the compound (c) with the compound (b) to obtain a contact product, (2) contacting said contact product with the compound (a) to obtain a second contact product, and (3) contacting said second contact product with the particle (d).

Method 12 Comprising the Steps of:

(1) contacting the compound (c) with the particle (d) to obtain a contact product, (2) contacting said contact product with the compound (b) to obtain a second contact product, and (3) contacting said second contact product with the compound (a).

It is recommendable to carry out the above-mentioned contacts under an inert gas atmosphere. A contact temperature is usually from −100 to 300° C., and preferably from −80 to 200° C. A contact time is usually from 1 minute to 200 hours, and preferably from 10 minutes to 100 hours. The contact is carried out with or without a solvent.

As the solvent, a solvent, which does not react with any of the compounds (a) to (c) and the particle and any of the contact products, is usually used. However, it is permitted to use any solvent, which reacts with any of the compounds (a) to (c) but does not react with the above-mentioned any contact product. For example, it is permitted to use any solvent in the step (1) of the above-mentioned Method 1, which solvent reacts with the compound (a), but does not react with the contact product obtained in said step.

Examples of the solvent are non-polar solvents such as aliphatic hydrocarbon solvents and aromatic hydrocarbon solvents; and polar solvents such as halide solvents, ether solvents, alcohol solvents, phenol solvents, carbonyl solvents, phosphoric acid derivatives, nitrile solvents, nitro compounds, amine solvents and sulfur compounds.

Specific examples thereof are aliphatic hydrocarbon solvents such as butane, pentane, hexane, heptane, octane, 2,2,4-trimethylpentane and cyclohexane; aromatic hydrocarbon solvents such as benzene, toluene and xylene; halide solvents such as dichloromethane, dichlorodifluoromethane, chloroform, 1,2-dichloroethane, 1,2-dibromoethane, 1,1,2-trichloro-1,2,2-trifluoroethane, tetrachloroethylene, chlorobenzene, bromobenzene and o-dichlorobenzene; ether solvents such as dimethyl ether, diethyl ether, diisopropyl ether, di-n-butyl ether, methyl-tert-butyl ether, anisole, 1,4-dioxane, 1,2-dimethoxyethane, bis(2-methoxyethyl) ether, tetrahydrofuran and tetrahydropyran; alcohol solvents such as methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxy ethanol, 2-ethoxy ethanol, diethylene glycol, triethylene glycol and glycerol; phenol solvents such as phenol and p-cresol; carbonyl solvents such as acetone, ethyl methyl ketone, cyclohexanone, acetic anhydride, ethyl acetate, butyl acetate, ethylene carbonate, propylene carbonate, N,N-dimethylformamide, N,N-dimethylacetamide and N-methyl-2-pyrrolidone; phosphoric acid derivatives such as hexamethylphosphate triamide and triethyl phosphate; nitrile solvents such as acetonitrile, propionitrile, succinonitrile and benzonitrile; nitro compounds such as nitromethane and nitrobenzene; amine solvents such as pyridine, piperidine and morpholine; and sulfur compounds such as dimethylsulfoxide and sulfolane.

As a solvent used in the respective steps (2) of the above processes 1, 3 and 7, preferable are aliphatic hydrocarbon solvents, aromatic hydrocarbon solvents or ether solvents; and as a solvent used in the respective steps (3) thereof, preferable are polar solvents.

There is known an $E_T^N$ value as an index indicating a polarity of a solvent (C. Reichardt, "Solvents and Solvents Effects in Organic Chemistry", 2nd ed., VCH Verlag (1988)). In the present invention, a solvent satisfying $0.8 \geq E_T^N \geq 0.1$ is particularly preferable. Examples of such a solvent are dichloromethane, dichlorodifluoromethane, chloroform, 1,2-dichloroethane, 1,2-dibromoethane, 1,1,2-trichloro-1,2,2-trifluoroethane, tetrachloroethylene, chlorobenzene, bromobenzene, o-dichlorobenzene, dimethyl ether, diethyl ether, diisopropyl ether, di-n-butyl ether, methyl tert-butyl ether, anisole, 1,4-dioxane, 1,2-dimethoxyethane, bis(2-methoxyethyl) ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxy ethanol, 2-ethoxy ethanol, diethylene glycol, triethylene glycol, acetone, ethyl methyl ketone, cyclohexanone, acetic anhydride, ethyl acetate, butyl acetate, ethylene carbonate, propylene carbonate, N,N-dimethylformamide, N,N-dimethylacetamide, N-methyl-2-pyrrolidone, hexamethylphosphate triamide, triethyl phosphate, acetonitrile, propionitrile, succinonitrile, benzonitrile, nitromethane, nitrobenzene, ethylenediamine, pyridine, piperidine, morpholine, dimethylsulfoxide and sulfolane. Among them, further preferable are dimethyl ether, diethyl ether, diisopropyl ether, di-n-butyl ether, methyl tert-butyl ether, anisole, 1,4-dioxane, 1,2-dimethoxyethane, bis(2-methoxyethyl) ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxy ethanol, 2-ethoxy ethanol, diethylene glycol and triethylene glycol; particularly preferable are di-n-butyl ether, methyl tert-butyl ether, 1,4-dioxane, tetrahydrofuran, methanol, ethanol, 1-propanol, 2-propanol, 1-butanol, 2-butanol, 2-methyl-1-propanol, 3-methyl-1-butanol and cyclohexanol; and the most preferable are tetrahydrofuran, methanol, ethanol, 1-propanol and 2-propanol.

The above-mentioned polar solvents can be used as a mixed solvent in combination with hydrocarbon solvents such as aliphatic hydrocarbon solvents and aromatic hydrocarbon solvents. Examples of the mixed solvent are a hexane/methanol mixed solvent, a hexane/ethanol mixed solvent, a hexane/1-propanol mixed solvent, a hexane/2-propanol mixed solvent, a heptane/methanol mixed solvent, a heptane/ethanol mixed solvent, a heptane/1-propanol mixed solvent, a heptane/2-propanol mixed solvent, a toluene/methanol mixed solvent, a toluene/ethanol mixed solvent, a toluene/1-propanol mixed solvent, a toluene/2-propanol mixed solvent, a xylene/methanol mixed solvent, a xylene/ethanol mixed solvent, a xylene/1-propanol mixed solvent and a xylene/2-propanol mixed solvent. Among them, preferable are a hexane/methanol mixed solvent, a hexane/ethanol mixed solvent, a heptane/methanol mixed solvent, a heptane/ethanol mixed solvent, a toluene/methanol mixed solvent, a toluene/ethanol mixed solvent, a xylene/methanol mixed solvent and a xylene/ethanol mixed solvent; more preferable are a hexane/methanol mixed solvent, a hexane/ethanol mixed solvent, a toluene/methanol mixed solvent and a toluene/ethanol mixed solvent; and the most preferable is a toluene/ethanol mixed solvent. A proportion of ethanol in the toluene/ethanol mixed solvent is preferably from 10 to 50% by volume, and more preferably from 15 to 30% by volume, provided that the mixed solvent is 100% by volume.

As a solvent used in each step (2) of the above-mentioned Methods 1, 3 and 7, and as a solvent used in each step (3) thereof, a hydrocarbon solvent may be used. In this case, the shorter a time interval between a finishing time of step (2) and a starting time of step (3), the more preferable. Said time interval is preferably from 0 to 5 hours, more preferably from 0 to 3 hours, and the most preferably from 0 to 1 hour. A contact temperature in step (3) is usually from −100° C. to 40° C., preferably from −20° C. to 200° C., and the most preferably from −10° C. to 10° C.

While a solvent used in the above Methods 2, 5, 6 and 8 to 12 may be a non-polar solvent or a polar solvent, a non-polar solvent is preferable, because it is considered that any contact product obtained according to these Methods has usually a low solubility to the non-polar solvent, and therefore, the contact product is easy to deposit (easy to fix) on the surface of the particle (d) when the contact product and the particle (d) co-exist in the non-polar solvent.

Amounts of respective compounds (a) to (c) mentioned above are not particularly limited. It is preferable that y and z substantially satisfy the following formula (1), provided that a molar ratio of the amounts of respective compounds is expressed by compound (a): compound (b): compound (c)=1:y:z. In this formula, m is a number corresponding to a valence of $M^1$.

$$|m-y-2z| \leq 1 \tag{1}$$

In this formula, y is preferably from 0.01 to 1.99, more preferably from 0.10 to 1.80, much more preferably from 0.20 to 1.50, and the most preferably from 0.30 to 1.00. A preferable amount, a more preferable amount, a much more preferable amount and the most preferable amount of z can be determined by replacing m and y in the above formula (1) by a valence of $M^1$ and a value given above for y, respectively.

An amount of the particle (d) used in the preparation of the particle (I) is such that an amount of a typical metal atom contained in 1 g of the particle obtained by contact between the compound (a) and the particle (d) is preferably not less than 0.1 mmol, and more preferably from 0.5 to 20 mmol.

In the above-mentioned Methods 1 to 12, it is recommendable to add a heating step after each step (3) in order to further advance the reaction. In this additional step, it is preferable to use a solvent having a high boiling point to carry out the heating at a higher temperature. For this reason, it is permitted to replace the solvent used in steps (1) to (3) with another solvent having a higher boiling point.

It is permitted that the particle (I) contains unreacted compounds (a) to (c) and unreacted particle (d). However, it is preferable to wash the particle (I) with a solvent to remove said unreacted materials. Said solvent may be the same as or different from that used for the preparation of the particle (I).

The particle (I) separated from the reaction mixture obtained according to the above-mentioned Methods through solid-liquid separation is preferably dried under reduced pressure. The drying is carried out preferably at a temperature of not lower than 25° C. for a drying period of time of 1 hour to 24 hours, more preferably at 40° C. to 200° C. for 1 to 24 hours, much more preferably at 60° C. to 200° C. for 1 to 24 hours, particularly preferably at 60° C. to 160° C. for 2 to 18 hours, and the most preferably at 80° C. to 160° C. for 4 to 18 hours.

As the aluminoxane used for the preparation of the above-mentioned particle (I), the cyclic aluminoxane having a structure represented by the formula, $\{-Al(E^2)-O-\}_b$, the linear aluminoxane having a structure represented by the formula, $E^3\{-Al(E^3)-O-\}_c AlE^3{}_2$ or a mixture thereof is preferable. In these formulas, $E^2$ and $E^3$ are independently of one another a hydrocarbyl group; all $E^2$ and all $E^3$ may be the same or different; Z is a hydrogen atom or a halogen atom; all Z may be the same or different; a is a number satisfying $0<a\leq 3$; b is an integer of not less than 2; and c is an integer of not less than 1.

As said hydrocarbyl group, that having 1 to 8 carbon atoms is preferable, and an alkyl group is more preferred. Examples of the above-mentioned $E^2$ and $E^3$ are alkyl groups such as a methyl group, an ethyl group, a n-propyl group, an isopropyl group, a n-butyl group, an isobutyl group, a n-pentyl group and a neopentyl group. Preferably, $E^2$ and $E^3$ are each a methyl group or an isobutyl group, b is 2 to 40, and c is 1 to 40.

A process for producing the above-mentioned aluminoxane is not particularly limited, and may be a conventional one. As the process, there are exemplified (1) a process comprising the steps of (i) dissolving a trialkylaluminum such as trimethylaluminum in an organic solvent such as benzene, toluene and an aliphatic hydrocarbon and (ii) contacting the resulting solution with water with each other, and (2) a process comprising the step of (i) contacting a trialkylaluminum such as trimethylaluminum with a metal salt containing crystal water such as copper sulfate hydrate with each other. It is considered that the aluminoxane obtained according to those processes is a mixture of the cyclic aluminoxane and the linear aluminoxane.

A method for contacting the aluminoxane with the particle (d) is not limited. For example, the contact can be completed by adding the aluminoxane to a dispersion prepared by dispersing the particle (d) in a solvent. As the solvent, the above-mentioned solvents exemplified for the preparation of the particle (I) are exemplified. Among these, a solvent which does not react with the aluminoxane is preferable, and a solvent which dissolves the aluminoxane is more preferable. As the solvent, aromatic hydrocarbon solvents such as benzene, toluene and xylene, or aliphatic hydrocarbon solvents such as hexane, heptane and octane are preferable, and toluene or xylene is much more preferable.

A temperature and time for the above-mentioned contact are not limited. The temperature is usually from −100° C. to 200° C., preferably from −50° C. to 150° C., and more preferably from −20° C. to 120° C. Since an exothermic reaction proceeds at an initial stage of the contact, it is recommendable to carry out the contact at a low temperature in order to control heat generation. Amounts of the aluminoxane used and the particle (d) used are not limited. The aluminoxane is used in an amount of usually from 0.01 to 100 mmol, preferably from 0.1 to 20 mmol, and more preferably from 1 to 10 mmol as a total amount of the aluminum atom contained in the aluminoxane used, per 1 g of the particle (d).

It is preferable that each of the above-mentioned particles (I) and (II) is used in combination with an organoaluminum compound.

Said organoaluminum compound may be a conventional one. A preferable compound is that represented by the following formula [7]. In this formula, $R^4$ is a hydrocarbyl group, and all $R^4$ may be the same or different; Y is a hydrogen atom, a halogen atom, an alkoxy group, an aralkyloxy group or an aryoxy group, and all Y may be the same or different; and c is a number satisfying $0<c\leq 3$.

$$R^4_c AlY_{3-c} \qquad [7]$$

In the formula [7], $R^4$ is preferably a hydrocarbyl group having 1 to 24 carbon atoms, and more preferably an alkyl group having 1 to 24 carbon atoms. Examples thereof are a methyl group, an ethyl group, a n-propyl group, a n-butyl group, an isobutyl group, an-hexyl group, a 2-methylhexyl group and an-octyl group. Of these, an ethyl group, a n-butyl group, an isobutyl group, a n-hexyl group and a n-octyl group are preferable.

Examples of the halogen atom as Y in the formula [7] are a fluorine atom, a chlorine atom, a bromine atom and an iodine atom. Of these, a chlorine atom is preferred.

As the alkoxy group as Y in the formula [7], that having 1 to 24 carbon atoms is preferable. Examples thereof are a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, an-dodecoxy group, an-pentadecoxy group and an-eicosoxy group. Of these, a methoxy group, an ethoxy group or a tert-butoxy group is preferable.

As the aryloxy group as Y in the formula [7], an aryloxy group having 6 to 24 carbon atoms is preferable. Examples thereof are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 3,4,5-trimethylphenoxy group, a 2,3,4,5-trimerethylphenoxy group, a 2,3,4,6-tetramethylphenoxy group, a 2,3,5,6-tetramethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group and an anthrathenoxy group.

As the aralkyloxy group as Y in the formula [7], an aralkyloxy group having 7 to 24 carbon atoms is preferable. Examples thereof are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a (n-tetradecylphenyl)methoxy group, a naphthylmethoxy group and an anthrathenylmethoxy group. Of these, a benzyloxy group is preferable.

Examples of the compound represented by the above formula [7] are trialkylaluminums such as trimethylaluminum, triethylaluminum, tri-n-propylaluminum, tri-n-butylaluminum, triisobutylaluminum, tri-n-hexylaluminum and tri-n-octylaluminum; dialkylaluminum chlorides such as dimethylaluminum chloride, diethylaluminum chloride, di-n-propylaluminum chloride, di-n-butylaluminum chloride, diisobutylaluminum chloride, di-n-hexylaluminum chloride and di-n-octylaluminum chloride; alkylaluminum dichlorides such as methylaluminum dichloride, ethylaluminum dichloride, n-propylaluminum dichloride, n-butylaluminum dichloride, isobutylaluminum dichloride, n-hexylaluminum dichloride and n-octylaluminum dichloride; dialkylaluminum hydrides such as dimethylaluminum hydride, diethylaluminum hydride, di-n-propylaluminum hydride, di-n-butylaluminum hydride, diisobutylaluminum hydride, di-n-hexylaluminum hydride and di-n-octylaluminum hydride; trialkoxyaluminums such as trimethoxyaluminum, triethoxyaluminum and tri(tert-butoxy)aluminum; alkyl (dialkoxy)aluminums such as methyl(dimethoxy) aluminum, methyl(diethoxy)aluminum and methyl(di-tert-butoxy)aluminum; dialkyl(alkoxy)aluminums such as dimethyl(methoxy)aluminum, dimethyl(ethoxy)aluminum and dimethyl(tert -butoxy) aluminum; triaryloxyaluminums such as triphenoxyaluminum, tris(2,6-diisopropylphenoxy) aluminum and tris(2,6-diphenylphenoxy)aluminum; alkyl (diaryloxy) aluminums such as methyl(diphenoxy) aluminum, methylbis(2,6-diisopropylphenoxy)aluminum and methylbis(2,6-diphenylphenoxy)aluminum; and dialkyl (aryloxy)aluminums such as dimethyl(phenoxy)aluminum, dimethyl(2,6-diisopropylphenoxy)aluminum and dimethyl (2,6-diphenylphenoxy)aluminum.

Of these, trialkylaluminums are preferable, trimethylaluminum, triethylaluminum, tri-n-butylaluminum, triisobutylaluminum, tri-n-hexylaluminum or tri-n-octylaluminum is more preferable, and triisobutylaluminum or tri-n-octylaluminum is particularly preferable.

It is permitted to use a combination of two or more of aluminum compounds mentioned above.

An amount of the catalyst component (A) used is usually from $1\times10^{-6}$ to $1\times10^{-3}$ mol, and preferably from $5\times10^{-6}$ to $5\times10^{-4}$ mol per 1 g of the particle (D). An amount of the organoaluminum compound used is preferably from 0.01 to 10,000, more preferably from 0.1 to 5,000, and the most preferably from 1 to 2,000, which is expressed by a ratio, "quantity (mol) of an aluminum atom contained in the organoaluminum compound/quantity (mol) of a transition metal atom contained in the catalyst component (A)".

In the process for producing an addition polymer in accordance with the present invention, it is permitted that (1) respective components mentioned above are contacted with one another to obtain a catalyst for addition polymerization, which is then fed into a polymerization reaction apparatus, or (2) respective components mentioned above are fed separately into the polymerization reaction apparatus, in which respective components are contacted with one another to obtain the catalyst for addition polymerization. When the catalyst component (A), the particle (D) and the organoaluminum compound are used, it is permitted that any two components of those components are contacted with each other, and thereafter the remaining one is added thereto to further carry out the contact.

A method for feeding respective components for the catalyst into a reactor is not particularly limited. For example, (1) respective components for the catalyst may be fed thereto in a form of a solid, or (2) respective components for the catalyst may be fed thereto in a form of a solution, a suspension or a slurry prepared using a hydrocarbon solvent, wherein deactivation materials to the catalyst components such as water and oxygen have been sufficiently removed from the solvent in advance.

In said feeding methods, a concentration of the particle (D) is usually from 0.01 to 1000 g/liter, and preferably from 0.1 to 500 g/liter. A concentration of the organoaluminum compound is usually from 0.0001 to 100 mol/liter, and preferably from 0.01 to 10 mol/liter as a total amount of the Al atom contained in said compound. A concentration of the catalyst component (A) is usually from 0.0001 to 1000 mmol/liter, and preferably from 0.01 to 50 mmol/liter as a total amount of the transition metal atom contained in said component.

A polymerization method in the process for producing an addition polymer in accordance with the present invention is not particularly limited. There are exemplified (1) a gas phase polymerization method comprising the step of polymerizing a gaseous monomer in a gas phase, (2) a solution polymerization method using a solvent, (3) a slurry polymerization method using a solvent, and (4) a bulk polymerization method using a monomer itself to be polymerized as a solvent. Examples of the solvent are aliphatic hydrocarbon solvents such as butane, pentane, hexane, heptane and octane; aromatic hydrocarbon solvents such as benzene and toluene; and halogenated hydrocarbon solvents such as methylene chloride.

As a polymerization manner in the process for producing an addition polymer in accordance with the present invention, a batch polymerization manner and a continuous polymerization manner are exemplified. Said process may contain two or more steps, which are different in their reaction conditions. It is permitted to appropriately determine a polymerization time depending upon a kind of an addition polymer obtained and a reaction apparatus. The time is usually from 1 minute to 20 hours.

A method and conditions of the slurry polymerization method are not limited and may be conventional. Preferable is a method using a continuation system reactor, according to which components such as a monomer, a comonomer, materials to be fed and a diluent are continuously fed into the reactor, and the addition polymer is recovered from the reactor continuously or periodically. As the reactor, (1) a loop reactor and (2) a reactor composed of more than one stirring type reactor different in a form and a reaction condition, which are connected in series or in parallel, or a combination thereof, are exemplified. As the above-mentioned diluent, inert diluents (mediums) such as paraffin, cycloparaffin and an aromatic hydrocarbon are exemplified.

A temperature of the polymerization reactor or a reaction zone is usually from about 0° C. to about 150° C., and preferably from 30° C. to 100° C. A pressure is usually from about 0.1 MPa to about 10 MPa, and preferably from 0.5 MPa to 5 MPa. It is permitted to adjust the pressure to a degree under which (i) the catalyst can be maintained in a suspension state, (ii) the medium and at least a part of the monomer and the comonomer can be maintained in a liquid phase, and (iii) the contact between the monomer and the comonomer can be attained. The medium, temperature and pressure may be selected so as to produce and recover the solid and particulate addition polymer.

A molecular weight of the addition polymer obtained can be controlled in a conventional manner, such as (1) a manner of controlling a temperature of a reaction zone, and (2) a manner of introducing hydrogen.

Respective components mentioned above are fed into the reactor or a reaction zone in any order. As a feeding method, (1) a method of feeding respective components at the same time, and (2) a method of feeding them one after another are exemplified. It is permitted that respective components for the catalyst are contacted with one another under an inert atmosphere prior to contact with the monomer and the comonomer.

A method and conditions of the gas phase polymerization method mentioned above are not limited and may be conventional. As a reaction apparatus, a fluidized bed type reaction vessel is exemplified. A fluidized bed type reaction vessel having an enlarged portion is particularly preferred. Said reaction vessel may have a stirring blade.

As a method for feeding respective components into the polymerization vessel, (1) a method of feeding them in a water free state using an inert gas such as nitrogen and argon or a gas such as hydrogen and ethylene, and (2) a method of feeding them in a solution or a slurry state using a solvent. Each component for the catalyst may be fed independently.

Alternatively, any components may be contacted in advance with one another in an any order, and thereafter the contact product may be fed.

A polymerization temperature is lower than that at which the addition polymer is melted, preferably from 0° C. to 150° C., and particularly preferably from 30° C. to 100° C. In order to control melt flow property of the addition polymer obtained, it is permitted to add hydrogen as a molecular weight regulator. The mixed gas to be polymerized may be combined with an inert gas.

In the present invention, a pre-polymerization mentioned below may be carried out prior to the above-mentioned polymerization (real polymerization).

The pre-polymerization means a step of polymerizing a small amount of an olefin in the presence of the catalyst component (A) and the particle (D), and if desired, the organoaluminum compound. It is recommendable to carry out the step in a slurry state. As a solvent used for formation of the slurry, inert hydrocarbons such as propane, butane, isobutane, pentane, isopentane, hexane, heptane, octane, cyclohexane, benzene and toluene are exemplified. A part or the total amount of the inert hydrocarbon may be replaced by a liquefied olefin.

An amount of the organoaluminum compound used in the pre-polymerization is from 0.5 to 700 mol, preferably from 0.8 to 500 mol, and particularly preferably from 1 to 200 mol, per 1 mol of the catalyst component (A).

An amount of the olefin to be pre-polymerized is usually from 0.01 to 1000 g, preferably from 0.05 to 500 g, and particularly preferably from 0.1 to 200 g, per 1 g of the particle (D).

A slurry concentration in the pre-polymerization is preferably from 0.1 to 50 g-particle (D)/liter-solvent, and particularly preferably from 0.5 to 20 g-particle (D)/liter-solvent. A pre-polymerization temperature is preferably from −20° C. to 100° C., and particularly preferably from 0° C. to 80° C. A partial pressure of the olefin in the gas phase of the pre-polymerization is preferably from 0.001 MPa to 2 MPa, and particularly preferably from 0.01 MPa to 1 MPa, provided that an olefin which is a liquid under the pre-polymerization pressure at the pre-polymerization temperature is not limited thereto. A pre-polymerization time is not particularly limited, and a period of time from 2 minutes to 15 hours is usually suitable.

As a method for feeding the catalyst component (A), the particle (D), the organoaluminum compound and the olefin into the pre-polymerization, (1) a method wherein the catalyst component (A) and the particle (D), and if desired the organoaluminum compound are contacted with one another, and thereafter the olefin is fed thereto, (2) a method wherein the catalyst component (A), the particle (D) and the olefin are contacted with one another, and thereafter the organoaluminum compound is fed thereto, and (3) a method wherein the organoaluminum compound and the catalyst component (A) are contacted with each other in the presence of the olefin, and thereafter the particle (D) is fed thereto are exemplified. Particularly, preferable is a method wherein the olefin already exists at the time of contacting the particle (D) and the organoaluminum compound with each other.

As a method for feeding the olefin, there are exemplified (1) a method wherein the olefin is fed one after another while maintaining the pressure in the polymerization vessel to a predetermined degree, and (2) a method wherein the predetermined total amount of the olefin is fed in the first place. In order to regulate a molecular weight of the polymer obtained, it is permitted to add a chain transfer such as hydrogen.

In the present invention, the product obtained according to the pre-polymerization is used as a catalyst component or a catalyst for the real polymerization. Said catalyst component is a catalyst component obtained by pre-polymerizing the olefin in the presence of a primary catalyst, which primary catalyst is obtained by contacting the catalyst component (A) and the particle (D), and if desired, the organoaluminum compound with one another; and said catalyst is a catalyst obtained by pre-polymerizing the olefin in the presence of a primary catalyst, which primary catalyst is obtained by contacting the catalyst component (A) and the particle (D), and if desired, the organoaluminum compound with one another.

Examples of the monomer used in the process for producing an addition polymer in accordance with the present invention are olefins having 2 to 20 carbon atoms, diolefins, cyclic olefins, alkenyl aromatic hydrocarbons and polar monomers, and a combination of at least two kinds thereof.

Specific examples of the monomer are olefins such as ethylene, propylene, 1-butene, 1-pentene, 4-methyl-1-pentene, 5-methyl-1-hexene, 1-hexene, 1-heptene, 1-octene, 1-nonene and 1-decene; diolefins such as 1,5-hexadiene, 1,4-hexadiene, 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, 5-methyl-2-norbornene, norbornadiene, 5-methylene-2-norbornene, 1,5-cyclooctadiene, 5,8-endomethylenehexahydronaphthalene, 1,3-butadiene, isoprene, 1,3-hexadiene, 1,3-octadiene, 1,3-cyclooctadiene and 1,3-cyclohexadiene; cyclic olefins such as norbornene, 5-methylnorbornene, 5-ethylnorbornene, 5-butylnorbornene, 5-phenylnorbornene, 5-benzylnorbornene, tetracyclododecene, tricyclodecene, tricycloundecene, pentacyclopentadecene, pentacyclohexadecene, 8-methyltetracyclododecene, 8-ethyltetracyclododecene, 5-acetylnorbornene, 5-acetyloxynorbornene, 5-methoxycarbonylnorbornene, 5-ethoxycarbonylnorbornene, 5-methyl-5-methoxycarbonylnorbornene, 5-cyanonorbornene, 8-methoxycarbonyltetracyclododecene, 8-methyl-8-tetracyclododecene and 8-cyanotetracyclododecene; alkenyl aromatic hydrocarbons including alkenylbenzenes such as styrene, 2-phenylpropylene, 2-phenylbutene and 3-phenylpropylene; alkylstyrenes such as p-methylstyrene, m-methylstyrene, o-methylstyrene, p-ethylstyrene, m-ethylstyrene, o-ethylstyrene, 2,4-dimethylstyrene, 2,5-dimethylstyrene, 3,4-dimethylstyrene, 3,5-dimethylstyrene, 3-methyl-5-ethylstyrene, p-tert-butylstyrene and p-secbutylstyrene; bisalkenylbenzenes such as divinylbenzene; and alkenylnaphthalene such as 1-vinylnaphthalene; and polar monomers including α,β-unsaturated carboxylic acids such as acrylic acid, methacrylic acid, fumaric acid, maleic anhydride, itaconic acid, itaconic anhydride and bicyclo(2,2,1)-5-heptene-2,3-dicarboxylic acid; said α,β-unsaturated carboxylic acid metal salts of metals such as sodium, potassium, lithium, zinc, magnesium and calcium; α,β-unsaturated carboxylic acid esters such as methyl acrylate, ethyl acrylate, n-propyl acrylate, isopropyl acrylate, tert-butyl acrylate, 2-ethylhexyl acrylate, methyl methacrylate, ethyl methacrylate, n-propyl methacrylate, isopropyl methacrylate, n-butyl methacrylate and isobutyl methacrylate; unsaturated dicarboxylic acids such as maleic acid and itaconic acid; vinyl esters such as vinyl acetate, vinyl propionate, vinyl caproate, vinyl caprate, vinyl laurate, vinyl stearate and vinyl trifluoroacetate; unsaturated carboxylic acid glycidyl esters such as glycidyl acrylate, glycidyl methacrylate and mono-glycidyl itaconate.

The above-mentioned monomer may be used each alone or in combination thereof. Examples of the combination are ethylene-propylene, ethylene-1-butene, ethylene-1-hexene, ethylene-1-octene and propylene-1-butene.

The catalyst for addition polymerization obtained according to the process in accordance with the present invention is particularly suitable as a catalyst for olefin polymerization. As the addition polymer obtained according to the process in accordance with the present invention, a copolymer of ethylene and an α-olefin is particularly preferred. Of these, such a copolymer having a polyethylene crystal structure is particularly preferable. Preferable examples of said α-olefin are α-olefins having 3 to 8 carbon atoms such as 1-butene, 1-hexene and 1-octene.

EXAMPLES

The present invention is explained in more detail with reference to Examples and Comparative Examples as follows, but the present invention is not limited thereto.

The measurements values appeared in these Examples were obtained in the following manner.

1. Content of α-olefin Unit

A content of an α-olefin unit in the copolymer was measured by a method comprising the steps of:

(1) measuring each intensity of the characteristic absorption concerning the ethylene unit and α-olefin unit in the copolymer using an infrared spectrophotometer, a trade name of FT-IR 7300, manufactured by JASCO Corporation, (2) finding a content of α-olefin unit from the intensity using a calibration curve, and (3) expressing the content of α-olefin unit in terms of a short chain branch number (SCB) per 1000 carbon atoms.

2. Intrinsic Viscosity ([η]) (dl/g)

Using a tetralin solution, it was measured at 135° C. using an Ubbellohde viscometer.

3. Melt Flow Rate (MFR) (g/10 min)

According to a method prescribed in JIS K7210-1995, it was measured at 190° C. under a load of 21.18 N (2.16 kg). As a sample, a polymer containing 1000 ppm of an antioxidant was used.

4. Swell Ratio (SR)

It was found by dividing the strand diameter obtained in the above-mentioned MFR measurement by an inner diameter of a die (2.095 mm).

5. Melt Flow Rate Ratio (MFRR)

According to a method prescribed in JIS K7210-1995, it was found by dividing a melt flow rate measured at 190° C. under a load of 211.82 N (21.60 kg) by a melt flow rate measured at 190° C. under a load of 21.18 N (2.16 kg). The larger the MFRR value, the more preferable the flowability at the time of melting. As a sample, a polymer containing 1000 ppm of an antioxidant was used.

6. Molecular Weight and Molecular Weight Distribution

It was measured by gel permeation chromatography (GPC) under the following conditions. A calibration curve was prepared using a standard polystyrene. The molecular weight distribution was evaluated in terms of a ratio of Mw/Mn, wherein Mw is a weight average molecular weight, and Mn is a number average molecular weight.

Kind of machine: GPC, Type 150C, manufactured by Milipore Waters Co.

Column: a trade name of TSK-GEL GMH6-HT, three interconnected columns, each column having an inner diameter of 7.5 mm and a length of 300 mm.

Measurement temperature: 140° C.

Solvent: o-dichlorobenzene

Measurement concentration: 5 mg/5 ml

7. Elementary Analysis

With respect to Zn, it was measured by a method comprising the steps of:

(1) adding a sample to a sulfuric acid aqueous solution having a concentration of 1 M, (2) applying an ultrasonic wave thereto, thereby extracting a metal component, and (3) quantitatively analyzing the liquid extracted according to ICP emission spectrochemical analysis.

With respect to F, it was measured by a method comprising the steps of:

(1) burning a sample in a flask filled with oxygen, (2) absorbing the resulting combustion gas in a 10% sodium hydroxide aqueous solution, and (3) quantitatively analyzing the resulting solution according to ion selective electrode method.

8. Melt Tension (MT) (g)

It was measured in a manner such that using a melt tension tester manufactured by Toyo Seiki Seisakusyo, Ltd., a melted resin (150° C.) was extruded from an orifice having a diameter of 2.09 mmϕ and a length of 8 mm using a piston of a descent speed of 5.5 mm/min, and the extrudate is wound up at an ascent speed within a range of from 10 to 40 rpm/min. The larger the MT value, the higher the melt tension.

Example 1

(1) Production of Solid Product

In a 5 liter-volume four necked flask purged with nitrogen, 2 liters of tetrahydrofuran and 1.35 liters (2.7 mol) of a hexane solution (concentration=2M) of diethylzinc were introduced and the mixture was cooled to −50° C. A solution obtained by dissolving 251.5 g (1.37 mol) of pentafluorophenol in 390 ml of tetrahydrofuran was dropped thereto over 25 minutes. After completion of dropping, the temperature was gradually raised to ambient temperature, and stirring was continued for 3 hours. Thereafter, the temperature is raised to 45° C., and stirring was continued for 1 hour. Successively, the temperature was lowered to 20° C. using an ice bath, and 37.72 g (2.09 mol) of ion exchanged water was dropped thereto over 1.4 hours. Thereby, the reaction mixture was separated into a yellow transparent liquid product and a yellow gel like product. After completion of dropping, the reaction mixture was stirred for 2 hours, and then heated to 40° C., and thereafter further stirred for 1 hour. At ambient temperature, the reaction mixture was allowed to stand overnight, and thereafter, 72% by weight of the yellow transparent liquid product and a total of the yellow gel like product were separately transferred to different flasks purged with nitrogen, respectively. From respective products, volatile matters were removed by distillation, and respective residues were dried at 120° C. for 8 hours under reduced pressure. Thereafter, a solid product caused from the yellow transparent liquid product was dissolved in 3 liters of tetrahydrofuran, and the resulting solution was transferred to a 5 liter-volume flask, in which a solid product caused from the yellow gel like product had been introduced. The mixture was allowed to stand at ambient temperature for 69 hours, and thereafter dried at 120° C. under reduced pressure for 8 hours. As a result, 374 g of a solid product was obtained.

(2) Production of Particle (D)

In a 5 liter-volume four necked flask purged with nitrogen, 374 g of the solid product obtained in the above-mentioned Example 1 (1) and 3 liters of tetrahydrofuran were introduced and stirred. 282 Grams of silica obtained by heat-treating silica (average particle diameter=61 μm, pore volume=1.61 ml/g, specific surface area=296 m²/g), a trade name of SYLOPOL 948, manufactured by Davison Co., Ltd., at 300° C. under nitrogen stream was added thereto. The resulting mixture was heated to 40° C. and stirred for 2 hours. Thereafter, the solid component was allowed to precipitate, and the upper slurry portion was taken away. A washing operation was carried out in a manner such that 3 liters of tetrahydrofuran was added thereto, the mixture was stirred, thereafter the solid component was allowed to precipitate, and the upper slurry portion was taken away. Said washing operation was repeated 5 times. Using a glass filter, a liquid component was taken away, and thereafter the remaining component was dried under reduced pressure at 120° C. for 8 hours, thereby obtaining 452 g of a particle (D).

(3) Polymerization

A 3 liter-inner volume autoclave equipped with a stirrer was dried under reduced pressure, thereafter purged with argon, and then made vacuum. Hydrogen was introduced thereto so as to make its partial pressure 0.001 MPa. Successively, 680 g of butane and 70 g of 1-butene were fed therein, and the temperature was raised to 70° C. Thereafter, ethylene was introduced thereto so as to make its partial pressure 1.6 MPa, and the system was made steady. As a result of gas chromatography, the gas composition in the system was found to have 0.06 mol % of hydrogen and 3.22 mol % of 1-butene.

To the system, 0.9 ml of a heptane solution (concentration=1 mmol/ml) of triisobutylaluminum was added. Next, 0.20 ml of a toluene solution (concentration=1 μmol/ml) of racemic ethylenebis(1-indenyl)hafnium dichloride, and 0.60 ml of a toluene solution (concentration=2 μmol/ml) of bis(n-butylcyclopentadienyl) zirconium dichloride were added thereto. Successively, 14.6 mg of the particle (D) obtained in the above-mentioned Example 1 (2) was added thereto as a solid catalyst component. Polymerization was carried out at 70° C. for 60 minutes, while feeding ethylene gas to make the whole pressure constant.

As a result, 38 g of an olefin polymer having good particle property was obtained. A polymerization activity per all the transition metal atom was found to be $2.7 \times 10^7$ g/mol-transition metal atom/hour, and a polymerization activity per solid catalyst component was found to be 2600 g/g-solid catalyst component/hour. The SCB, MFR, MFRR, [η] and MT of the olefin polymer were found to be 13.7, 1.15, 21, 1.49 and 19.5, respectively.

Example 2

(1) Polymerization

A procedure similar to that of Example 1 (3) was carried out, except that a partial pressure of hydrogen was changed to 0.002 MPa. As a result, the gas composition in the system was found to have 0.08 mol % of hydrogen and 3.97 mol % of 1-butene.

Further, a procedure similar to that of Example 1 (3) was carried out, except that amounts of a toluene solution (concentration=1 μmol/ml) of racemic ethylenebis(1-indenyl)hafnium dichloride, a toluene solution (concentration=2 μmol/ml) of bis(n-butylcyclopentadienyl) zirconium dichloride and the particle (D) were changed to 0.10 ml, 0.40 ml and 13.2 mg, respectively.

As a result, 33 g of an olefin polymer having good particle property was obtained. A polymerization activity per all the transition metal atom was found to be $3.7 \times 10^7$ g/mol-transition metal atom/hour, and a polymerization activity per solid catalyst component was found to be 2500 g/g-solid catalyst component/hour. The SCB, MFR, MFRR, Mw, Mw/Mn, [η] and MT of the olefin polymer were found to be 13.9, 8.41, 19, $5.86 \times 10^4$, 1.85, 1.15 and 3.9, respectively.

Reference Example 1

(1) Polymerization

A procedure similar to that of Example 1 (3) was carried out, except that a partial pressure of hydrogen was changed to 0.012 MPa. As a result, the gas composition in the system was found to have 0.66 mol % of hydrogen and 2.23 mol % of 1-butene.

Further, a procedure similar to that of Example 1 (3) was carried out, except that a combination of 0.20 ml of a toluene solution (concentration=1 μmol/ml) of racemic ethylenebis (1-indenyl)hafnium dichloride and 0.60 ml of a toluene solution (concentration=2 μmol/ml) of bis(n-butylcyclopentadienyl)zirconium dichloride was changed to 0.25 ml of a toluene solution (concentration=2 μmol/ml) of racemic ethylenebis(1-indenyl) zirconium dichloride; the amount of the particle (D) was changed to 15.0 mg; and ethylene gas was changed to an ethylene-hydrogen mixed gas containing 0.31 mol % of hydrogen.

As a result, 68 g of an olefin polymer having good particle property was obtained. A polymerization activity per all the zirconium atom was found to be $1.4 \times 10^8$ g/mol-Zr/hour, and a polymerization activity per solid catalyst component was found to be 4500 g/g-solid catalyst component/hour. The SCB, MFR, MFRR, SR, Mw, Mw/Mn, [η] and MT of the olefin polymer were found to be 13.7, 1.53, 48, 1.29, $1.03 \times 10^5$, 4.00, 1.35 and 3.4, respectively.

Reference Example 2

(1) Polymerization

A procedure similar to that of Reference Example 1 (1) was carried out, except that a partial pressure of hydrogen was changed to 0.020 MPa. As a result, the gas composition in the system was found to have 1.00 mol % of hydrogen and 2.11 mol % of 1-butene.

Further, a procedure similar to that of Reference Example 1 (1) was carried out, except that the amount of the particle (D) was changed to 15.4 mg.

As a result, 50 g of an olefin polymer having good particle property was obtained. A polymerization activity per all the zirconium atom was found to be $1.0 \times 10^8$ g/mol-Zr/hour, and a polymerization activity per solid catalyst component was found to be 3300 g/g-solid catalyst component/hour. The SCB, MFR, MFRR, SR, Mw, Mw/Mn, [η] and MT of the olefin polymer were found to be 13.1, 4.06, 42, 1.38, $8.05 \times 10^4$, 4.24, 1.14 and 2.0, respectively.

Example 3

(1) Polymerization

A procedure similar to that of Example 1 (3) was carried out. As a result, the gas composition in the system was found to have 0.05 mol % of hydrogen and 3.14 mol % of 1-butene.

To the system, 0.9 ml of a heptane solution (concentration=1 mmol/ml) of triisobutylaluminum was added. Next, 7.9 ml of a toluene solution containing three kinds of the transition metal compound (concentration of racemic ethylenebis(1-indenyl)hafnium dichloride=0.84 μmol/ml, concentration of racemic ethylenebis(1-indenyl) zirconium dichloride=0.06 μmol/ml, and concentration of bis(n-butylcyclopentadienyl)zirconium dichloride=0.25 μmol/ml) was added thereto. Successively, 9.4 mg of the particle (D) obtained in the above-mentioned Example 1 (2) was added thereto as a solid catalyst component. Polymerization was carried out at 70° C. for 60 minutes, while feeding an ethylene-hydrogen mixed gas containing 0.10 mol % of hydrogen to make the whole pressure constant.

As a result, 59 g of an olefin polymer having good particle property was obtained. A polymerization activity per all the transition metal atom was found to be $6.5 \times 10^6$ g/mol-transition metal atom/hour, and a polymerization activity per solid catalyst component was found to be 6300 g/g-solid catalyst component/hour. The SCB, MFR, MFRR, SR and MT of the olefin polymer were found to be 14.2, 1.58, 49, 2.28 and 18.0, respectively.

Example 4

(1) Polymerization

A procedure similar to that of Example 3 (1) was carried out, except that a partial pressure of hydrogen was changed to 0.007 MPa. As a result, the gas composition in the system was found to have 0.26 mol % of hydrogen and 3.37 mol % of 1-butene.

Further, a procedure similar to that of Example 3 (1) was carried out, except that the amount of the particle (D) was changed to 10.2 mg, and the hydrogen concentration in the feeding ethylene-hydrogen mixed gas was changed to 0.24 mol %.

As a result, 47 g of an olefin polymer having good particle property was obtained. A polymerization activity per all the transition metal atom was found to be $5.2 \times 10^6$ g/mol-transition metal atom/hour, and a polymerization activity per solid catalyst component was found to be 4600 g/g-solid catalyst component/hour. The SCB, MFR, MFRR, SR and MT of the olefin polymer were found to be 14.6, 3.25, 47, 2.09 and 7.1, respectively.

What is claimed is:

1. A catalyst component for addition polymerization comprising:
    (i) a transition metal compound having (a) two cyclopentadiene type anion skeleton-carrying groups, which are linked with each other directly or through a bridging group, and (b) a hafnium atom as its central metal, and
    (ii) a transition metal compound having (a) two substituted cyclopentadiene type anion skeleton-carrying groups, which are not linked with each other, and (b) a zirconium atom or a titanium atom as its central atom;
    wherein said cyclopentadine type anion skeleton-carrying group of the transition metal compound (i) is an $\eta^5$-indenyl group or an $\eta^5$-alkyl-substitued indely group; and
    said substituted cyclopentadine type anion skeleton-carrying group of the transition meetal compound (ii) is an $\eta^5$-alkyl-substituded cyclopentadienyl group.

2. A process for producing a catalyst for addition polymerization, which comprises the step of contacting the catalyst component for addition polymerization according to claim 1 with a co-catalyst component for activation with each other.

3. A process for producing an addition polymer, which comprises the step of polymerizing a monomer in the presence of the catalyst for addition polymerization obtained by the process according to claim 2.

4. The process for producing an addition polymer according to claim 3, wherein the monomer contains an olefin.

5. The process for producing an addition polymer according to claim 3, wherein the monomer contains a combination of ethylene and an α-olefin.

6. A catalyst component for addition polymerization comprising:
    (i) a transition metal compound having (a) two cyclopentadiene type anion skeleton-carrying groups, which are linked with each other directly or through a bridging group, and (b) a hafnium atom as its central metal,
    (ii) a transition metal compound having (a) two substituted cyclopentadiene type anion skeleton-carrying groups, which are not linked with each other, and (b) a zirconium atom or a titanium atom as its central atom, and
    (iii) a transition metal compound having (a) two cyclopentadiene type anion skeleton-carrying groups, which are linked with each other directly or through a bridging group, and (b) a zirconium atom or a titanium atom as its central metal.

7. A process for producing a catalyst for addition polymerization, which comprises the step of contacting the catalyst component for addition polymerization according to claim 6 and a co-catalyst component for activation with each other.

8. A process for producing an addition polymer, which comprises the step of polymerizing a monomer in the presence of the catalyst for addition polymerization obtained by the process according to claim 7.

9. The process for producing an addition polymer according to claim 8, wherein the monomer contains an olefin.

10. The process for producing an addition polymer according to claim 8, wherein the monomer contains a combination of ethylene and an α-olefin.

* * * * *